(12) United States Patent
Hashimoto

(10) Patent No.: US 12,148,199 B2
(45) Date of Patent: Nov. 19, 2024

(54) ANALYSIS APPARATUS, ANALYSIS METHOD, AND COMPUTER-READABLE STORAGE MEDIUM STORING AN ANALYSIS PROGRAM

(71) Applicant: OMRON Corporation, Kyoto (JP)

(72) Inventor: Atsushi Hashimoto, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 399 days.

(21) Appl. No.: 17/777,294

(22) PCT Filed: Nov. 20, 2020

(86) PCT No.: PCT/JP2020/043315
§ 371 (c)(1),
(2) Date: May 17, 2022

(87) PCT Pub. No.: WO2021/131446
PCT Pub. Date: Jul. 1, 2021

(65) Prior Publication Data
US 2022/0406036 A1    Dec. 22, 2022

(30) Foreign Application Priority Data
Dec. 24, 2019   (JP) ................. 2019-233146

(51) Int. Cl.
*G06V 10/764*   (2022.01)
*G06V 10/422*   (2022.01)

(52) U.S. Cl.
CPC .......... *G06V 10/764* (2022.01); *G06V 10/422* (2022.01)

(58) Field of Classification Search
CPC ... G06T 7/0006; G06T 7/593; G06B 11/0691; G06V 20/52; G06V 20/41
See application file for complete search history.

(56) References Cited

U.S. PATENT DOCUMENTS 7,613,357 B2 * 11/2009 Owechko ............... G06V 10/32
                                                    382/293
7,715,591 B2 *  5/2010 Owechko ................. G06T 7/97
                                                    382/104
(Continued)

FOREIGN PATENT DOCUMENTS

JP        5081999 B1    11/2012
JP    2012-248017 A    12/2012
(Continued)

OTHER PUBLICATIONS

A Japanese Office Action mailed on Sep. 5, 2023 in a counterpart Japanese patent application.
(Continued)

*Primary Examiner* — Yosef Kassa
(74) *Attorney, Agent, or Firm* — METROLEX IP LAW GROUP, PLLC; Robert L. Scott, Esq.

(57) ABSTRACT

An analysis apparatus according to one or more embodiments may identify the classes of features included in object data using a plurality of discriminators that are respectively configured to discriminate the presence of features of classes different to each other; and determines that a first data portion, with respect to which discrimination is established by one of the plurality of discriminators, but discrimination is not established by the remaining discriminators, includes a feature of the particular class that is discriminated by the one discriminator, and determines that a second data portion, with respect to which discrimination is established by all of the discriminators including the one discriminator, does not include a feature of that particular class.

20 Claims, 15 Drawing Sheets

(56) References Cited

U.S. PATENT DOCUMENTS

| | | | |
|---|---|---|---|
| 8,233,665 B2* | 7/2012 | Nakatsukasa | G01B 11/24 |
| | | | 250/311 |
| 8,391,619 B2* | 3/2013 | Kawata | G06V 20/693 |
| | | | 382/242 |
| 8,564,655 B2* | 10/2013 | Fujieda | G06T 7/0006 |
| | | | 348/91 |
| 9,098,770 B2* | 8/2015 | Tsurumi | G06F 18/24323 |
| 2017/0154209 A1 | 6/2017 | Nakano et al. | |

FOREIGN PATENT DOCUMENTS

| | | |
|---|---|---|
| JP | 2013-41323 A | 2/2013 |
| JP | 2017-102671 A | 6/2017 |
| JP | 2019-159885 A | 9/2019 |

OTHER PUBLICATIONS

Sen Ayon et al: "Binarization With Boosting and Oversampling for Multiclass Classification", May 2, 2016, pp. 1078-1091, vol. 46, No. 5, IEEE Transactions on Cybernetics, Piscataway, NJ, USA; Relevance is indicated in the EESR issued on Jun. 22, 2023 in a counterpart European patent application.

The extended European search report (EESR) issued on Jun. 22, 2023 in a counterpart European patent application.

Watanabe et al, "Consideration of Feature Detectors and Classifiers for Working Image Classification", The Papers of Joint Technical Meeting on "Perception Information" and "Innovative Industrial System", Sep. 5, 2016, pp. 35-40, IEE Japan; Relevance is indicated in the ISR/WO mailed on Dec. 22, 2020.

Kasuya et al, "A Feasibility Study of Scene Text Recognition Based on Filtered Channel Features", IEICE Technical Report, Mar. 3, 2016, pp. 99-104, vol. 115, No. 505; Relevance is indicated in the ISR/WO mailed on Dec. 22, 2020.

Ishii et al, "AE-based Classifier Estimating and Eliminating Variables that Deteriorate the Classification", IPSJ Journal, Jan. 15, 2019, pp. 260-269, vol. 60, No. 1, , ISSN: 1882-7764, [online], Retrieved from the Internet: <URL: http://id.nii.ac.jp/1001/00193817/>; Relevance is indicated in the ISR/WO mailed on Dec. 22, 2020.

An English translation of the International Search Report ("ISR") of PCT/JP2020/043315 mailed on Dec. 22, 2020.

The Written Opinion("WO") of PCT/JP2020/043315 mailed on Dec. 22, 2020.

* cited by examiner

ANALYSIS APPARATUS, ANALYSIS METHOD, AND COMPUTER-READABLE STORAGE MEDIUM STORING AN ANALYSIS PROGRAM

TECHNICAL FIELD

The present disclosure relates to an analysis apparatus, an analysis method, and computer-readable storage medium storing an analysis program.

RELATED ART

There are techniques for discriminating the type of action of a person from sensing data using a discriminator (e.g., Patent Document 1). The discriminator that can be used for discriminating the action type can be generated using various methods such as machine learning. For example, learning data can be created by acquiring sensing data from a sensor that observes the action of a person, and assigning labels that indicate the action type to data portions in which a particular action appears. Also, a discriminator that has acquired the capability of discriminating the action types can be generated by using the created learning data for machine learning (e.g., Patent Document 2).

RELATED ART DOCUMENT

Non-Patent Document

Patent Document 1: JP 2013-041323A
Patent Document 2: JP 2012-248017A
Patent Document 3: JP 5081999B

SUMMARY

The inventors found that the known discrimination methods have the following problems. That is, sensing data to be used for discrimination may include information other than the information specific to a particular action, such as information regarding actions of a different type or information regarding events other than actions. For example, information irrelevant to actions such as background information included in image data may be included in data portions of different types of actions. Also, when a motion that is shared by actions of different types is included, information regarding this shared motion may be included in data portions of these types of actions. In particular, in a period of transition from one action to another action, information regarding actions of a plurality of types may be included in corresponding data portions. As a result of information other than the information specific to the actions adversely affecting discrimination, there is a problem in that the discrimination accuracy of the discriminator is degraded. For example, let us assume that there is a feature that is shared by a first type of action and a second type of action. When a discriminator is configured to discriminate that the first type of action is executed based on the presence of this shared feature, the accuracy of the discriminator that discriminates the first type of action can be degraded because of the presence of this shared feature. In the aforementioned period in which transition of the action occurs, it may be difficult to accurately specify the time at which the particular action starts and the time at which the action ends because of the degradation of discrimination accuracy of the discriminator with respect to the obtained sensing data.

When generating a discriminator by machine learning, it is conceivable to prepare learning data that has captured actions in various conditions, that is, to improve the quality of learning data, as a method for improving the discrimination performance of the discriminator. However, it is costly and difficult to prepare learning data that has captured actions under every condition. Also, it is difficult to uniquely determine the transition timing from one action to a different action. For example, in a period of transition from one action to a different action, the switching time of a label indicating the action type may change due to factors such as different operators making actions, a change in an operator's determination criterion, and action features appearing in sensing data being different. For example, a case may occur in which, in the same learning data, in one part, a label is switched to a relatively earlier timing in an action transition (i.e. transition to another action), and in contrast, in a different part, the label is switched to a relatively later timing in an action transition. As a result of this shift in boundaries being reflected on machine learning, it is possible that an improvement of the discrimination performance of a discriminator cannot be expected. Therefore, there is a limit to the improvement of discrimination performance of a discriminator by increasing the quality of learning data.

Note that this problem is not specific to scenarios in which the type of action of a person is discriminated from sensing data. This problem may occur in various scenarios in which the class of some feature included in data is discriminated. Scenarios in which the class of some feature included in data is discriminated include, in addition to the aforementioned scenario in which the type of action of person is discriminated, scenarios in which the type of work process is discriminated from data obtained by observing the work process in a production line, and scenarios in which the class of a person's state is discriminated from data obtained by observing the state of the person (e.g., Patent Document 3), for example. In these scenarios as well, with the known discrimination method, as a result of information other than the information specific to the features of a particular class adversely affecting discrimination, the discrimination accuracy of the discriminator can be degraded.

One or more embodiments may provide a technique for improving the accuracy of discriminating the classes of features included in data.

One or more embodiments may adopt the following configurations.

That is, an analysis apparatus according to one or more embodiments may include: a data acquiring unit configured to acquire object data; a discrimination processing unit configured to identify the classes of features included in the object data using a plurality of discriminators that are respectively configured to discriminate the presence of features of classes different to each other; and a determining unit configured to determine, based on the identification result, data portions in the object data that include features of the respective classes, and to determine that a first data portion, with respect to which discrimination is established by one of the plurality of discriminators, but discrimination is not established by the remaining discriminators, includes a feature of a particular class that is discriminated by the one discriminator, and determine that a second data portion, with respect to which discrimination is established by all of the discriminators including the one discriminator, does not include a feature of that particular class.

According to this configuration, a discriminator is prepared for each class to be discriminated. When discrimination is established by one discriminator, but discrimination is not established by the remaining discriminators, it may be surmised that it is highly possible that an event specific to a feature corresponding to its class occurs. Therefore, it is discriminated that, in this data portion, a feature of the class to be discriminated by the one discriminator is included. On the other hand, when discrimination is established by all of the discriminators including the one discriminator, it may be surmised that it is highly possible that an event not specific to the corresponding feature of the particular class, that is, an event shared by the features of all of the classes occurs. Therefore, it is discriminated that, in this data portion, the feature of the class to be discriminated by one discriminator is not included. Accordingly, a data portion in which an event shared by the features of the respective classes merely occurs and that does not truly include a feature of the particular class may be prevented from being erroneously discriminated to include a feature of that particular class. Therefore, according to one or more embodiments, the accuracy of discriminating the class of a feature included in data may be improved.

The analysis apparatus according to the one or more embodiments may further includes: an assignment unit configured to assign information indicating that a feature of the particular class is included, to the first data portion. According to this configuration, the class of a feature included in data may be accurately discriminated, and therefore high quality learning data that may be used in machine learning may be generated by assigning information indicating the discrimination result to the object data.

In the analysis apparatus according to the one or more embodiments, the discriminators may be configured to generate, from first data that includes a feature of a class to be discriminated, second data that includes a feature of the class to be discriminated, and is of the same type as the object data, and the discrimination processing unit may identify the class of a feature included in the object data, based on a comparison between generation data generated by the discriminators and the object data. According to this configuration, in a discrimination process in which discriminators that are configured to generate data including features of corresponding classes are used, the accuracy of discriminating the class of a feature included in data may be improved. Note that the first data may be data of the same type as the second data. Alternatively, the first data may be data that captures the same event as the second data, and is of different type from the second data. Also, when the first data and the second data are time series data, the discriminators may generate second data at the particular time from first data at a past or future time relative to that particular time.

In the analysis apparatus according to the one or more embodiments, the first data and the second data may be data of the same type, and the discrimination processing unit may generate the generation data by giving the object data to the discriminators. According to this configuration, in a discrimination process in which discriminators that are configured to generate data including features of corresponding classes are used, the process for discriminating the class of a feature included in data may be simplified.

In the analysis apparatus according to the one or more embodiments, the object data may be time series data, and the determining unit may determine time sections of the data portions, in the time series data, that include the features of the respective classes based on the identification result. According to this configuration, the accuracy of discriminating the class of a feature, with respect to time series data, may be improved.

In the analysis apparatus according to the one or more embodiments, the object data may be multi-dimensional data, and the determining unit may determine ranges of the data portions, in the multi-dimensional data, that include the features of the respective classes based on the identification result. According to this configuration, the accuracy of discriminating the class of a feature, with respect to multi-dimensional data, may be improved.

In the analysis apparatus according to the one or more embodiments, the discriminators may be respectively configured to discriminate executions of different types of actions performed by an examinee as presence of the features, and the determining unit may determine the data portions, in the object data, in which executions of the respective types of actions appear, based on the identification result. According to this configuration, in a scenario of analyzing the action of person, the accuracy of discriminating the action type may be improved.

In the analysis apparatus according to the one or more embodiments, the discriminators may be respectively configured to discriminate executions of different types of processes in a production line as presence of the features, and the determining unit may determine the data portions, in the object data, in which executions of the respective types of processes appear, based on the identification result. According to this configuration, in a scenario of analyzing the work process in a production line, the accuracy of discriminating the work process type may be improved.

One or more embodiments may also be an information processing method for realizing the configurations described above, a program, or a storage medium that may be read by an apparatus such as a computer, a machine, or the like, and stores such a program. Here, the storage medium that may be read by a computer or the like is a medium that stores information such as programs via an electrical, magnetic, optical, mechanical or chemical effect.

For example, an analysis method according to one or more embodiments may include an information processing method in which a computer executes: a step of acquiring object data; a step of identifying the classes of features included in the object data using a plurality of discriminators that are respectively configured to discriminate the presence of features of classes different to each other; and a step of determining, based on the identification result, data portions in the object data that include the features of the respective classes, and determining that a first data portion, with respect to which discrimination is established by one of the plurality of discriminators, but discrimination is not established by the remaining discriminators, includes a feature of the particular class that is discriminated by the one discriminator, and determining that a second data portion, with respect to which discrimination is established by all of the discriminators including the one discriminator, does not include a feature of that particular class.

Also, for example, an analysis program according to one or more embodiments may include an a program for causing a computer to execute: a step of acquiring object data; a step of identifying the classes of features included in the object data using a plurality of discriminators that are respectively configured to discriminate the presence of features of classes different to each other; and a step of determining, based on the identification result, data portions in the object data that include the features of the respective classes, and determining that a first data portion, with respect to which discrimination is established by one of the plurality of discriminators, but discrimination is not established by the remaining discriminators, includes a feature of the particular class that is discriminated by the one discriminator, and determining that a second data portion, with respect to which discrimination is established by all of the discriminators including the one discriminator, does not include a feature of that particular class.

According to one or more embodiments, the accuracy of discriminating the classes of features included in data may be improved.

Hereinafter, an embodiment according to one aspect of the present invention (also referred to as "the present embodiment" below) will be described based on the drawings. However, the embodiment described below is merely an example of the present invention in every respect. Needless to say, at least any of various improvements and modifications may be made without departing from the scope of the present invention. That is to say, to implement the present invention, a specific configuration corresponding to that implementation may also be employed as appropriate. Note that, although data that is used in the embodiment is9agnetibed using natural language, more specifically, the data is defined by pseudo-language, such data may be given by commands, parameters, machine language, or the like that can be recognized by a computer.

1. APPLICATION EXAMPLE

Figure 1:
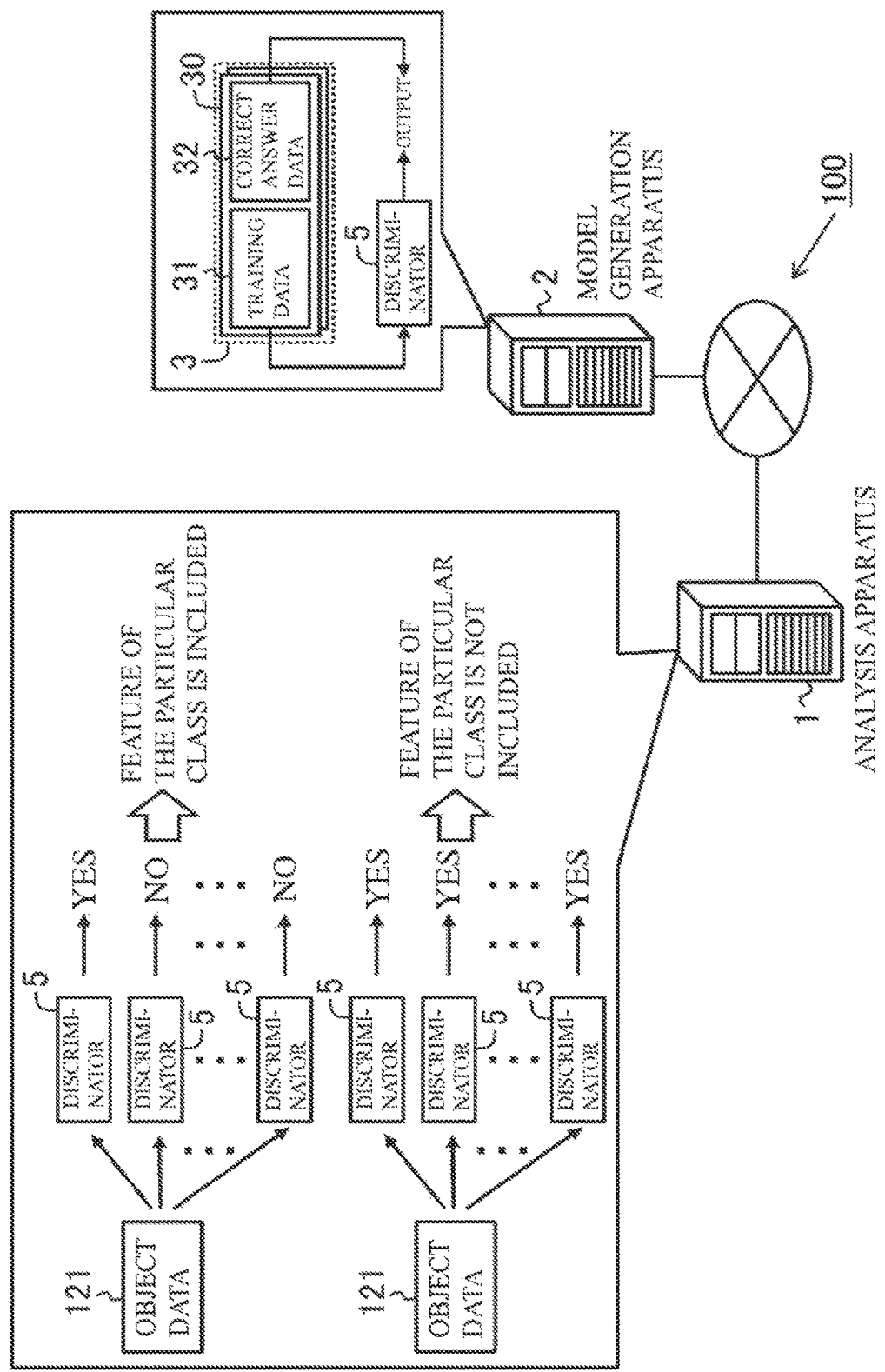
FIG. 1 is a diagram schematically illustrating an example of a scenario to which one or more embodiments is applied.

FIG. 1 schematically illustrates an example of a scenario to which the present invention is applied. As shown in FIG. 1, an analysis system 100 according to the present embodiment includes an analysis apparatus 1 and a model generation apparatus 2.

The analysis apparatus 1 according to the present embodiment is a computer configured to discriminate the classes of features included in object data 121 that is acquired. First, the analysis apparatus 1 according to the present embodiment acquires object data 121. There is no particular limitation to the type of the object data 121, and it may be selected as appropriate depending on the embodiment. The object data 121 may be image data, sound data, numerical data, text data, or measurement data of various sensors, for example. In the following, measurement data obtained by a sensor may also be referred to as "sensing data". The object data 121 may also be sensing data obtained by a sensor observing some object, for example. The sensor may be an image sensor (camera), an infrared sensor, a sound sensor (microphone), an ultrasonic sensor, a pressure sensor, an acceleration sensor, an environment sensor, a vital sensor, a medical examination apparatus, or an in-vehicle sensor, for example. The camera may be an ordinary RGB camera, a depth camera, or an infrared camera, for example. The environment sensor may be a barometer, a thermometer, a hygrometer, a sound pressure sensor, a sound sensor, an ultraviolet sensor, an illumination meter, a precipitation gauge, or a gas sensor, for example. The vital sensor may be a blood-pressure gauge, a pulsimeter, a heart rate meter, an electrocardiographic monitor, an electromyograph, a clinical thermometer, an electro dermal activity sensor, a microwave sensor, an electroencephalograph, a 10agnetoencephalography, an activity tracker, a glucometer, an ocular potentiometer, or an eye movement measuring instrument, for example. The medical examination apparatus may be a CT (computed tomography) apparatus, or an MRI (magnetic resonance imaging) apparatus, for example. The in-vehicle sensor may be an image sensor, a Lidar (light detection and ranging) sensor, a millimeter-wave radar, an ultrasonic sensor, or an acceleration sensor, for example.

Next, the analysis apparatus 1 according to the present embodiment tries to identify/discriminate the class of a feature included in object data 121 using a plurality of discriminators 5 that are respectively configured to discriminate the presence of features of classes that are different to each other. There is no particular limitation to the feature, as long as the feature relates to some event that appears in data, and may be selected as appropriate depending on the embodiment. The feature may be related to an action executed by a person, a work process in a production line, or a state of a person, for example. The features to be discriminated are not limited to features related to a current event, and may also be related to a future or past event. Also, the classes may be set as appropriate depending on the features. Class may also be referred to as "categories" or the like. There is no particular limitation to the number of classes to be set and the number of discriminators, and they may be determined as appropriate depending on the embodiment. As described later, in the present embodiment, trained neural networks are used for the discriminators 5.

Also, the analysis apparatus 1 according to the present embodiment determines data portions, in the object data 121, in which features of the respective classes are included based on the identification result. The analysis apparatus 1 according to the present embodiment determines that a first data portion, with respect to which discrimination is established by one of the plurality of discriminators 5, but discrimination is not established by the remaining discriminators 5, includes a feature of the particular class that is discriminated by the one discriminator. On the other hand, the analysis apparatus 1 according to the present embodiment determines that a second data portion, with respect to which discrimination is established by all of the discriminators 5 including the one discriminator, does not include a feature of that particular class. Accordingly, the classes of features included in portions of the object data 121 can be discriminated.

On the other hand, the model generation apparatus 2 according to the present embodiment is a computer configured to generate discriminators 5 that can be used in the analysis apparatus 1 by performing machine learning. The model generation apparatus 2 according to the present embodiment acquires learning data 3. The configuration of the learning data 3 may be determined as appropriate depending on the type of model adopted for the discriminators 5. In the present embodiment, the learning data 3 is constituted by a plurality of learning data sets 30. The plurality of learning data sets 30 are one example of learning data to be used in machine learning of the discriminators. Each learning data set 30 is constituted by a combination of training data 31 and correct answer data 32. The training data 31 is a sample of data of the same type as the object data 121. The correct answer data 32 indicates a correct answer for the task of discriminating the feature with respect to the training data 31. The correct answer data 32 may also be referred to as "teaching signal", "label", or the like. The learning data 3 may also be separately acquired for each discriminator 5.

The model generation apparatus 2 according to the present embodiment performs machine learning for each discriminator 5 using the acquired learning data 3. In the present embodiment, the model generation apparatus 2 trains a particular discriminator 5 such that, with respect to each learning data set 30, the result obtained by the particular discriminator 5 determining whether or not the training data 31 includes a feature of the corresponding class matches the correct answer data 32. With this, trained discriminators 5 that have acquired the capability of discriminating the presence of features of corresponding classes can be generated. Note that "trained" may also be referred to as "subjected to machine learning", simply as "trained", or the like. Also, the model generation apparatus 2 may also be simply referred to as a "generation apparatus", a "learning apparatus", or the like.

As described above, in the present embodiment, discriminators 5 are prepared for respective classes to be discriminated. It can be surmised that a first data portion, with respect to which discrimination is established by one of the plurality of discriminators 5, but discrimination is not established by the remaining discriminators 5, includes a feature of the class that is known by the one discriminator, but is not known by the remaining discriminators. That is, it can be surmised that the likelihood that an event specific to the feature of the particular class regarding which the one discriminator performs discrimination appears in this first data portion is high. Therefore, the analysis apparatus 1 according to the present embodiment determines that the first data portion includes a feature of the class to be discriminated by the one discriminator. On the other hand, it can be surmised that a second data portion, with respect to which discrimination is established by all of the discriminators 5 including the one discriminator, includes a common (ordinary) feature that is known by all of the discriminators 5. That is, it can be surmised that it is highly likely that an event that is not specific to the feature of the class to be discriminated by the one discriminator, but is shared by features of all of the classes occurs in this second data portion. Therefore, the analysis apparatus 1 according to the present embodiment determines that the second data portion does not include a feature of the class to be discriminated by the one discriminator. Accordingly, a data portion in which merely an event shared by the features of all classes occurs and that does not truly include the feature of a particular class can be prevented from being erroneously discriminated to include the feature of that particular class. Therefore, according to the present embodiment, the accuracy of discriminating the classes of features included in the data can be improved.

Note that, in the example in FIG. 1, the analysis apparatus 1 and the model generation apparatus 2 are connected to each other via a network. The type of the network may be selected as appropriate from the Internet, a wireless communication network, a mobile communication network, a telephone network, a dedicated network, and the like. Note that the method for exchanging data between the analysis apparatus 1 and the model generation apparatus 2 is not limited to this example, and may be selected as appropriate depending on the embodiment. For example, data may be exchanged between the analysis apparatus 1 and the model generation apparatus 2 using a storage medium.

Also, in the example in FIG. 1, the analysis apparatus 1 and the model generation apparatus 2 are constituted by separate computers. However, the configuration of the analysis system 100 according to the present embodiment is not limited to this example, and may be determined as appropriate depending on the embodiment. For example, the analysis apparatus 1 and the model generation apparatus 2 may also be constituted by one computer. Also, at least one of the analysis apparatus 1 and the model generation apparatus 2 may also be constituted by a plurality of computers, for example.

2. EXEMPLARY CONFIGURATION

[Hardware Configuration]
<Analysis Apparatus>

Figure 2:
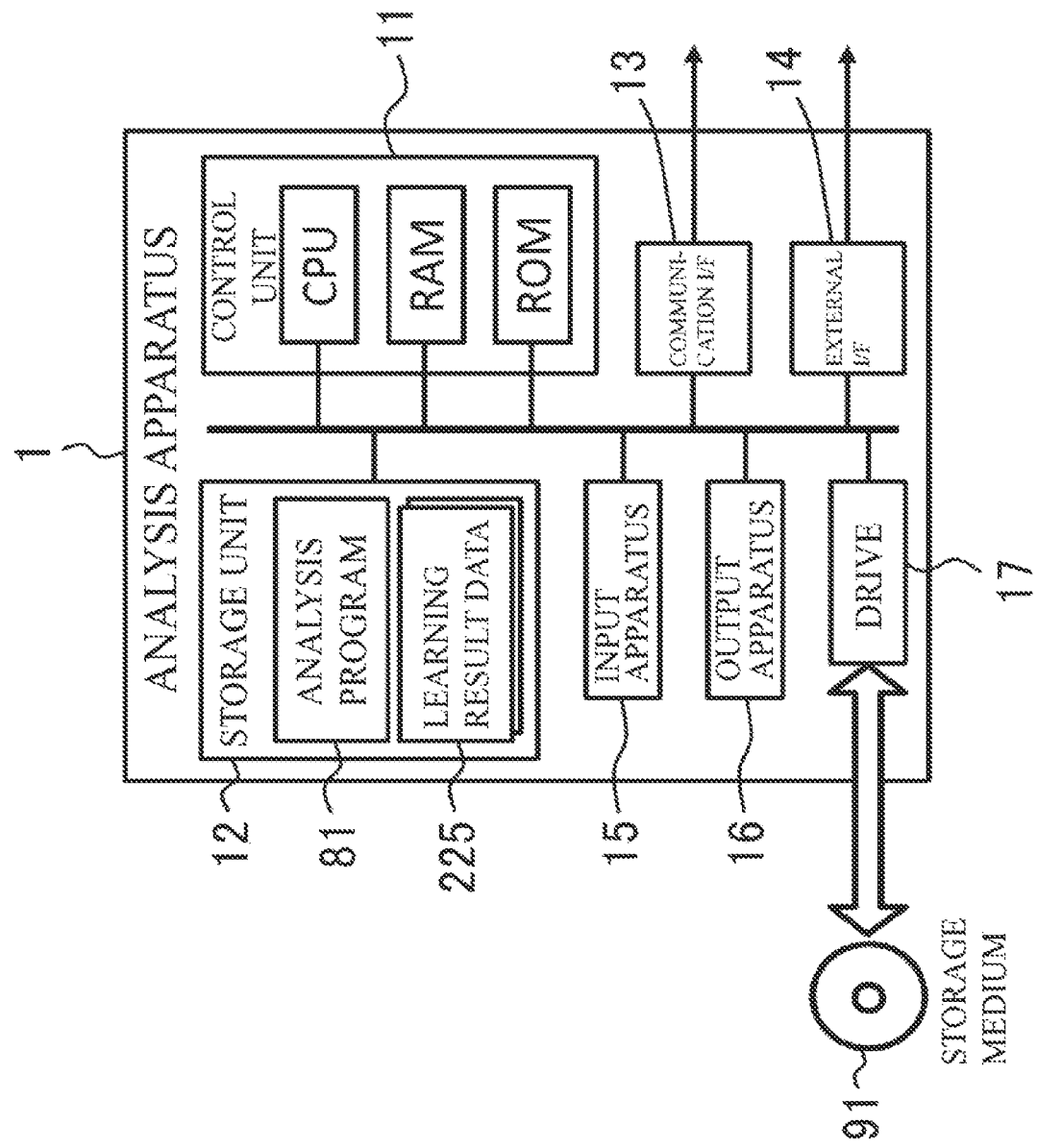
FIG. 2 is a diagram schematically illustrating an example of a hardware configuration of an analysis apparatus according to one or more embodiments.

FIG. 2 schematically illustrates an example of a hardware configuration of the analysis apparatus 1 according to the present embodiment. As shown in FIG. 2, the analysis apparatus 1 according to the present embodiment is a computer in which a control unit 11, a storage unit 12, a communication interface 13, an external interface 14, an input apparatus 15, an output apparatus 16, and a drive 17 are electrically connected. Note that, in FIG. 2, the communication interface and the external interface are denoted as "communication I/F" and "external I/F".

The control unit 11 includes a CPU (central processing unit), which is a hardware processor, a RAM (random access memory), a ROM (read only memory), and the like, and is configured to execute information processes based on a program and various types of data. The storage unit 12 is an example of a memory, and is constituted by a hard disk drive, a solid-state drive, or the like. In the present embodiment, the storage unit 12 stores various types of information such as an analysis program 81 and a plurality of sets of learning result data 225.

The analysis program 81 is a program for the analysis apparatus 1 to execute a later-described information process (FIG. 7) for discriminating the classes of features included in the data. The analysis program 81 includes a series of commands of the information process. Each set of learning result data 225 indicates information regarding a corresponding trained discriminator 5 that is generated by machine learning.

The communication interface 13 is a wired LAN (local area network) module, a wireless LAN module, or the like, and is an interface for performing wired or wireless communication via a network. The analysis apparatus 1 may execute data communication with another information processing apparatus via the network by using the communication interface 13. The external interface 14 is a USB (universal serial bus) port, a dedicated port, or the like, and is an interface for connecting to an external apparatus. The type and the number of external interfaces 14 may be selected as appropriate. When the object data 121 is acquired by sensors, the analysis apparatus 1 may be connected to a particular sensor via at least one of the communication interface 13 and the external interface 14.

The input apparatus 15 is an apparatus for performing input, such as a mouse or a keyboard. Also, the output apparatus 16 is an apparatus for performing output, such as a display, a speaker, or the like. An operator such as a user can operate the analysis apparatus 1 by using the input apparatus 15 and the output apparatus 16.

The drive 17 is a CD drive, a DVD drive, or the like, and is a drive apparatus for reading various types of information such as a program stored in a storage medium 91. The storage medium 91 is a medium that stores information such as programs via an electrical, magnetic, optical, mechanical or chemical effect such that the stored information such as the programs can be read by an apparatus or a machine such as a computer. At least one of the analysis program 81 and the learning result data 225 may be stored in the storage medium 91. The analysis apparatus 1 may acquire at least one of the analysis program 81 and the learning result data 225 from this storage medium 91. Note that, in FIG. 2, a disk-type storage medium such as a CD or a DVD is illustrated as an example of the storage medium 91. However, the type of the storage medium 91 is not limited to the disk type, and may be a medium other than a disk type medium. Storage media other than a disk type medium include a semiconductor memory such as a flash memory, for example. The type of the drive 17 may be selected as appropriate depending on the type of the storage medium 91.

Note that, regarding the specific hardware configuration of the analysis apparatus 1, constituent elements can be omitted, replaced, and added as appropriate depending on the embodiment. For example, the control unit 11 may also include a plurality of hardware processors. The hardware processors may also be constituted by a microprocessor, an FPGA (field-programmable gate array), a DSP (digital signal processor), and the like. The storage unit 12 may be constituted by the RAM and ROM included in the control unit 11. At least one of the communication interface 13, the external interface 14, the input apparatus 15, the output apparatus 16, and the drive 17 may be omitted. The analysis apparatus 1 may also be constituted by a plurality of computers. In this case, the hardware configuration of the computers may be the same, or may not be the same. Also, the analysis apparatus 1 may also be a general-purpose server apparatus, a PC (personal computer), a PLC (programmable logic controller), or the like, instead of an information processing apparatus that is specifically designed for the service to be provided.

<Model Generation Apparatus>

Figure 3:
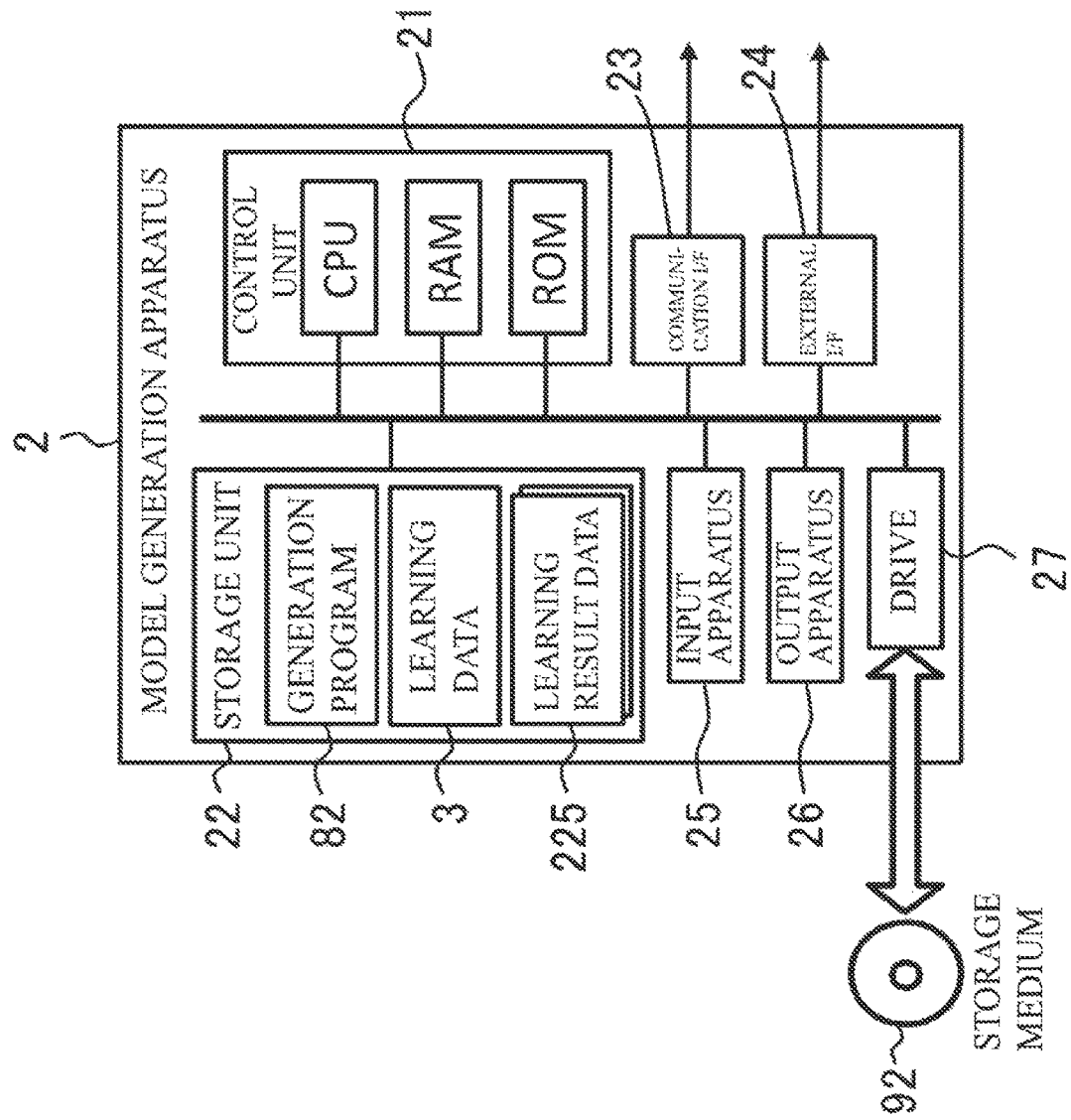
FIG. 3 is a diagram schematically illustrating an example of a hardware configuration of a model generation apparatus according to one or more embodiments.

FIG. 3 schematically illustrates an example of a hardware configuration of the model generation apparatus 2 according to the present embodiment. As shown in FIG. 3, the model generation apparatus 2 according to the present embodiment is a computer in which a control unit 21, a storage unit 22, a communication interface 23, an external interface 24, an input apparatus 25, an output apparatus 26, and a drive 27 are electrically connected.

The units from the control unit 21 to the drive 27 of the model generation apparatus 2 and a storage medium 92 may be configured similarly to the units from the control unit 11 to the drive 17 of the analysis apparatus 1 and the storage medium 91 that are described above. That is, the control unit 21 includes a CPU, which is a hardware processor, a RAM, a ROM, and the like, and is configured to execute various information processes based on a program and data. The storage unit 22 is constituted by a hard disk drive, a solid-state drive, or the like. The storage unit 22 stores various types of information such as a generation program 82, learning data 3, and a plurality of sets of learning result data 225.

The generation program 82 is a program for the model generation apparatus 2 to execute a later-described information process (FIG. 6) for generating a trained discriminator 5 by performing machine learning. The generation program 82 includes a series of commands of this information process. The generation program 82 may also be referred to as a "model generation program", a "learning program", or the like. The learning data 3 is used for machine learning of the discriminators 5. Each set of learning result data 225 is generated as a result of executing the generation program 82 for a corresponding discriminator 5. At least one of the generation program 82 and the learning data 3 may be stored in the storage medium 92. Also, the model generation apparatus 2 may acquire at least one of the generation program 82 and the learning data 3 from the storage medium 92.

Note that, regarding the specific hardware configuration of the model generation apparatus 2, constituent elements can also be omitted, replaced, and added as appropriate depending on the embodiment. For example, the control unit 21 may include a plurality of hardware processors. The hardware processors may be constituted by a microprocessor, an FPGA, a DSP, and the like. The storage unit 22 may be constituted by the RAM and ROM included in the control unit 21. At least one of the communication interface 23, the external interface 24, the input apparatus 25, the output apparatus 26, and the drive 27 may be omitted. The model generation apparatus 2 may also be constituted by a plurality of computers. In this case, the hardware configuration of the computers may be the same, or may not be the same. The model generation apparatus 2 may be a general-purpose server apparatus, a general-purpose PC, or the like, instead of an information processing apparatus that is specifically designed for the service to be provided.

[Software Configuration]

<Analysis Apparatus>

Figure 4:
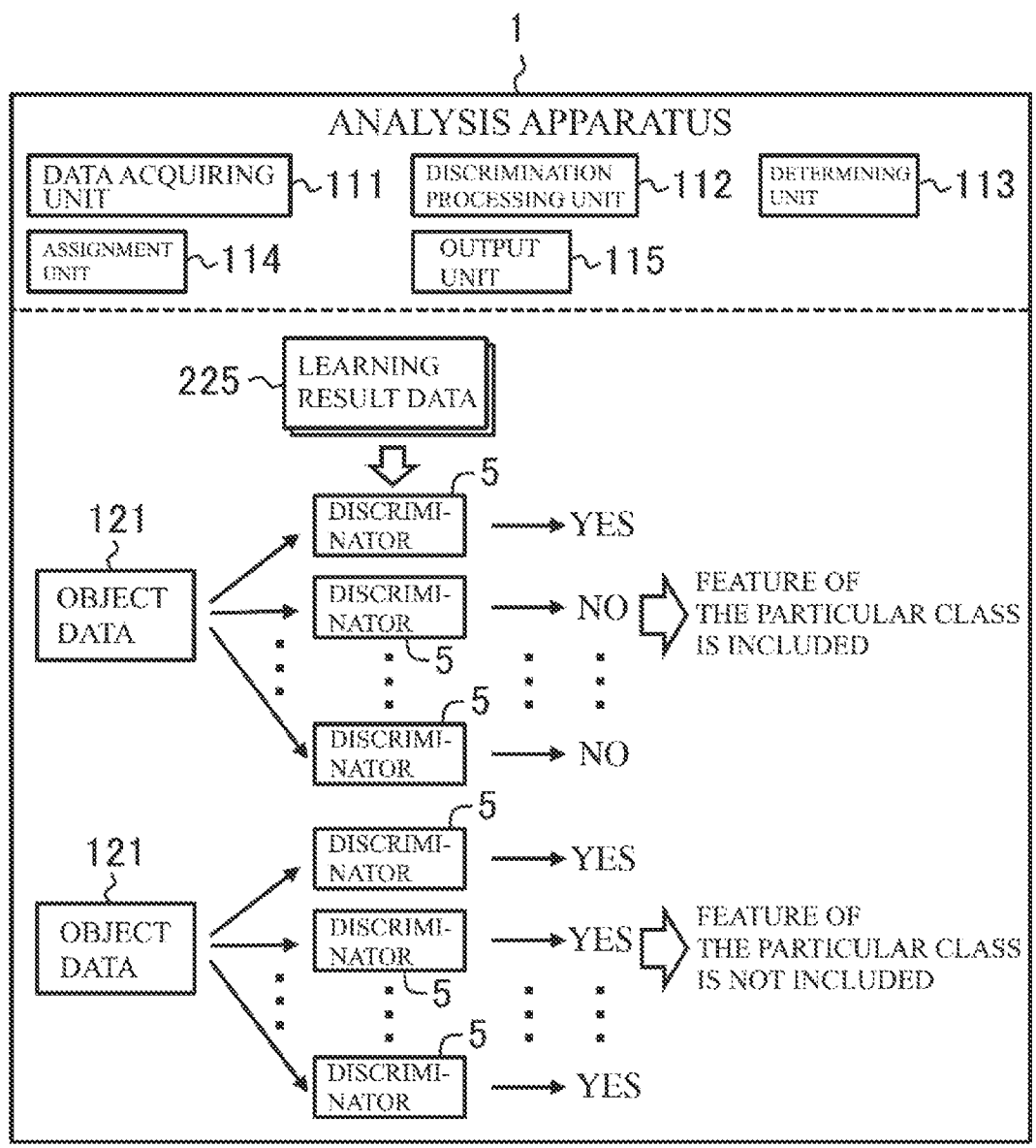
FIG. 4 is a diagram schematically illustrating an example of a software configuration of an analysis apparatus according to one or more embodiments.

FIG. 4 schematically illustrates an example of a software configuration of the analysis apparatus 1 according to the present embodiment. The control unit 11 of the analysis apparatus 1 deploys the analysis program 81 stored in the storage unit 12 to the RAM. Then, the control unit 11 controls the constituent elements by the CPU interpreting and executing instructions included in the analysis program 81 deployed to the RAM. With this, as shown in FIG. 4, the analysis apparatus 1 according to the present embodiment operates as a computer including a data acquiring unit 111, a discrimination processing unit 112, a determining unit 113, an assignment unit 114, and an output unit 115, as software modules. That is, in the present embodiment, the software modules of the analysis apparatus 1 are realized by the control unit 11 (CPU).

The data acquiring unit 111 acquires object data 121 for which a discrimination task is to be executed. The discrimination processing unit 112 includes a plurality of discriminators 5 that are respectively configured to discriminate the presence of features of different classes, by retaining a plurality of sets of learning result data 225. The discrimination processing unit 112 identifies the classes of features included in the acquired object data 121 using the plurality of discriminators 5.

The determining unit 113 determines data portions that include features of the respective classes in the object data 121, based on the identification result. The determining unit 113 determines that a first data portion, with respect to which discrimination is established by one of the plurality of discriminators 5, but discrimination is not established by the remaining discriminators 5, includes a feature of the particular class that is discriminated by this one discriminator. On the other hand, the determining unit 113 determines that a second data portion, with respect to which discrimination is established by all of the discriminators 5 including the one discriminator, does not include a feature of that particular class.

The assignment unit 114 assigns information (also referred to as a "label") indicating the determination result to the object data 121. This assigning process includes assigning information (hereinafter, also referred to as a "label") indicating that a feature of the particular class is included, to the first data portion. The output unit 115 outputs information regarding the result of discriminating the feature class.

<Model Generation Apparatus>

Figure 5:
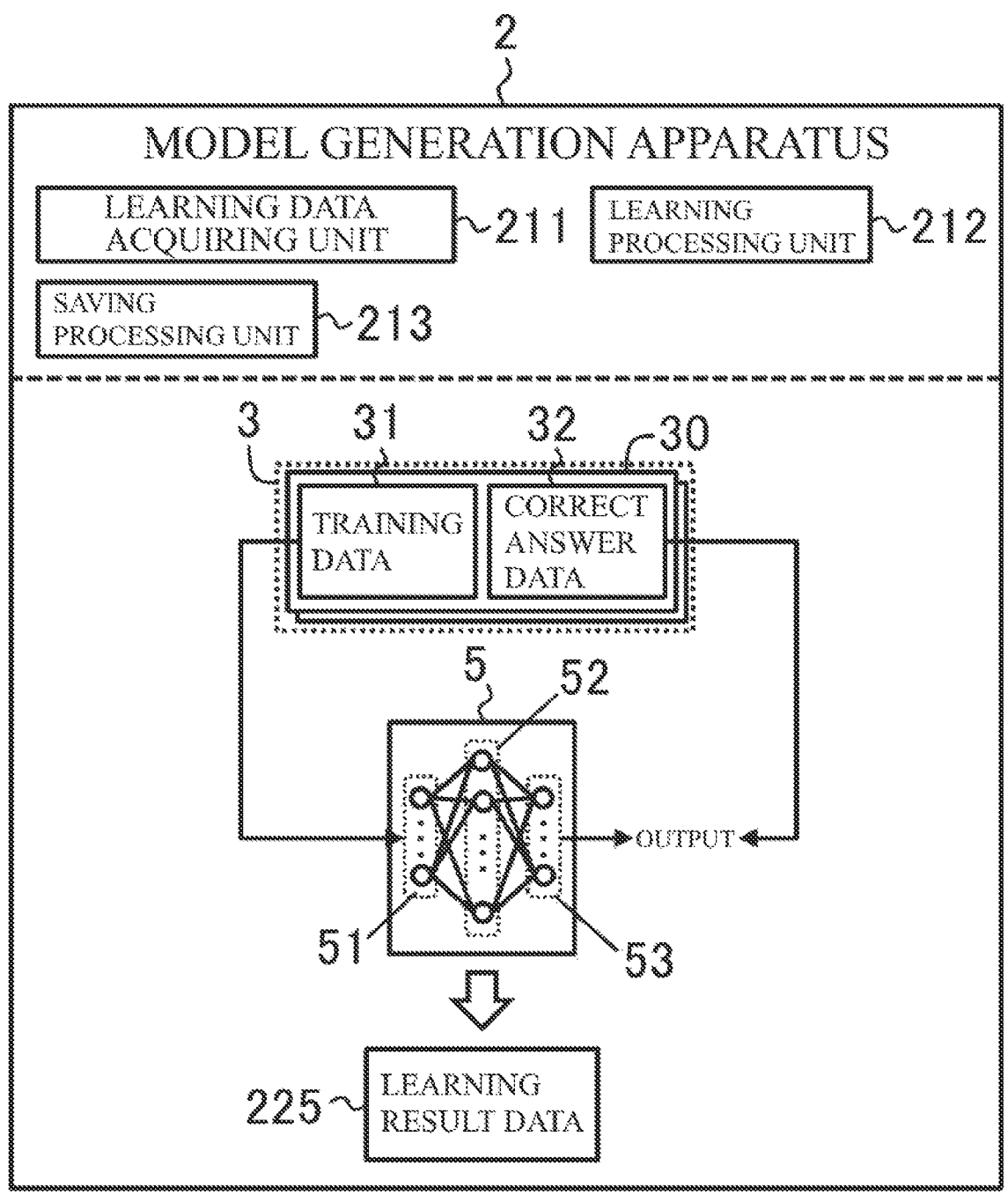
FIG. 5 is a diagram schematically illustrating an example of a software configuration of a model generation apparatus according to one or more embodiments.

FIG. 5 schematically illustrates an example of a software configuration of the model generation apparatus 2 according to the present embodiment. The control unit 21 of the model generation apparatus 2 deploys the generation program 82 stored in the storage unit 22 to the RAM. Then, the control unit 21 controls the constituent elements by the CPU interpreting and executing instructions included in the generation program 82 deployed to the RAM. With this, as shown in FIG. 5, the model generation apparatus 2 according to the present embodiment operates as a computer including a learning data acquiring unit 211, a learning processing unit 212, and a saving processing unit 213, as software modules. That is, in the present embodiment, the software modules of the model generation apparatus 2 are realized by the control unit 21 (CPU), similarly to the analysis apparatus 1 described above.

The learning data acquiring unit 211 acquires learning data 3. The learning processing unit 212 performs machine learning for each discriminator 5 using the learning data 3. In the present embodiment, the learning data 3 to be acquired is constituted by a plurality of learning data sets 30. Each learning data set 30 is constituted by a combination of training data 31 and correct answer data 32. The learning processing unit 212 trains the particular discriminator 5 such that, with respect to each learning data set 30, the result obtained by the particular discriminator 5 determining whether or not the training data 31 includes a feature of the corresponding class matches the correct answer data 32.

The saving processing unit 213 generates information regarding the trained discriminator 5 constructed by machine learning as learning result data 225. Also, the saving processing unit 213 saves the generated learning result data 225 in a predetermined storage area. The predetermined storage area may be selected as appropriate depending on the embodiment.

(Configuration of Discriminator)

Any model that can perform machine learning may be used for the discriminators 5. As illustrated in FIG. 5, in the present embodiment, each discriminator 5 is constituted by a multi-layered fully connected neural network. Each discriminator 5 includes an input layer 51, an intermediate (hidden) layer 52, and an output layer 53.

Note that the structure of the discriminators 5 is not limited to this example, and may be determined as appropriate depending on the embodiment. For example, the number of intermediate layers 52 is not limited to one, and may be two or more. Alternatively, the intermediate layer 52 may be omitted. The number of layers that constitute the neural networks of the respective discriminators 5 may be selected as appropriate. Also, in at least one of the combinations of the plurality of discriminators 5, the structure may be at least partially the same, or may not be the same.

The layers 51 to 53 each include at least one neuron (node). There is no particular limitation to the number of neurons (nodes) included in the layers 51 to 53, and they may be selected as appropriate depending on the embodiment. The number of neurons included in the input layer 51 may be determined as appropriate according to the data to be input and the format of the data. The number of neurons included in the output layer 53 may be determined as appropriate depending on the data to be output such as a discrimination result and the format of the data. Neurons in the adjacent layers are connected as appropriate. In the example in FIG. 5, each neuron in one layer is connected to all neurons in the adjacent layer. However, the connection relationship of neurons is not limited to this example, and may be set as appropriate depending on the embodiment.

A weight (connection load) is set for each connection. A threshold value is set for each neuron, and basically, the output of each neuron is determined based on whether or not the sum of products of inputs and respective weights exceeds the threshold value. The threshold value may be expressed by an activation function. In this case, the sum of products of inputs and respective weights is input to the activation function, computation of the activation function is executed, and as a result, the output of each neuron is determined. The type of the activation function may be selected as appropriate. The weights of the connections between neurons included in the layers 51 to 53 and the threshold value of each neuron are examples of the computation parameters that are used in computation processes of the discriminators 5. The values of the computation parameters of the discriminators 5 are adjusted by the machine learning such that an output that matches the discrimination of the particular class can be obtained.

The learning processing unit 212 inputs the training data 31, of each learning data set 30, to the input layer 51 of a discriminator 5, and acquires, from the output layer 53, an output value corresponding to the result of discriminating whether or not the training data 31 includes a feature of the corresponding class. In the machine learning of a discriminator 5, the learning processing unit 212 adjusts the values of the computation parameters of the discriminator 5 such that the error between the output value to be acquired and the correct answer indicated by the correct answer data 32 decreases. With this, by making use of the learning data 3, a trained discriminator 5 that has acquired the capability of discriminating the presence of a feature of the corresponding class can be generated.

Note that the data formats of inputs and outputs of the discriminators 5 are not limited in particular, and may be determined as appropriate depending on the embodiment. The input layers 51 of the discriminators 5 may be configured to receive an input of object data 121 as is, or may also be configured to receive an input of object data 121 subjected to some preprocessing. Also, the output layers 53 of the discriminators 5 may be configured to regress the degree of belonging to a corresponding class, for example. In this case, a configuration may be adopted in which the outputs of the output layers 53 are normalized to the range from 0 to 1 to indicate the probability of belonging to a corresponding class.

The saving processing unit 213 generates learning result data 225 for reproducing a trained discriminator 5 generated by machine learning. Any configuration of the learning result data 225 may be adopted as long as the trained discriminator 5 can be reproduced. For example, the saving processing unit 213 generates information indicating the values of computation parameters of the generated trained discriminator 5 as the learning result data 225. In some cases, information indicating the structure of the trained discriminator 5 may further be included in the learning result data 225. The structure may be specified by, in the neural network, the number of layers from the input layer to the output layer, the types of the layers, the numbers of neurons included in the respective layers, and the connection relationship between neurons in adjacent layers, for example. The saving processing unit 213 saves the generated learning result data 225 in a predetermined storage area.

<Other Considerations>

The software modules of the analysis apparatus 1 and the model generation apparatus 2 will be described in detail in a later-described exemplary operation. Note that, in the present embodiment, an example is described in which the software modules of the analysis apparatus 1 and the model generation apparatus 2 are realized by a general-purpose CPU. However, some of or all of the software modules described above may be realized by at least one dedicated processor. Also, regarding the software configuration of the analysis apparatus 1 and the model generation apparatus 2, software modules may also be omitted, replaced, and added as appropriate depending on the embodiment.

3. EXEMPLARY ACTION

[Model Generation Apparatus]

Figure 6:
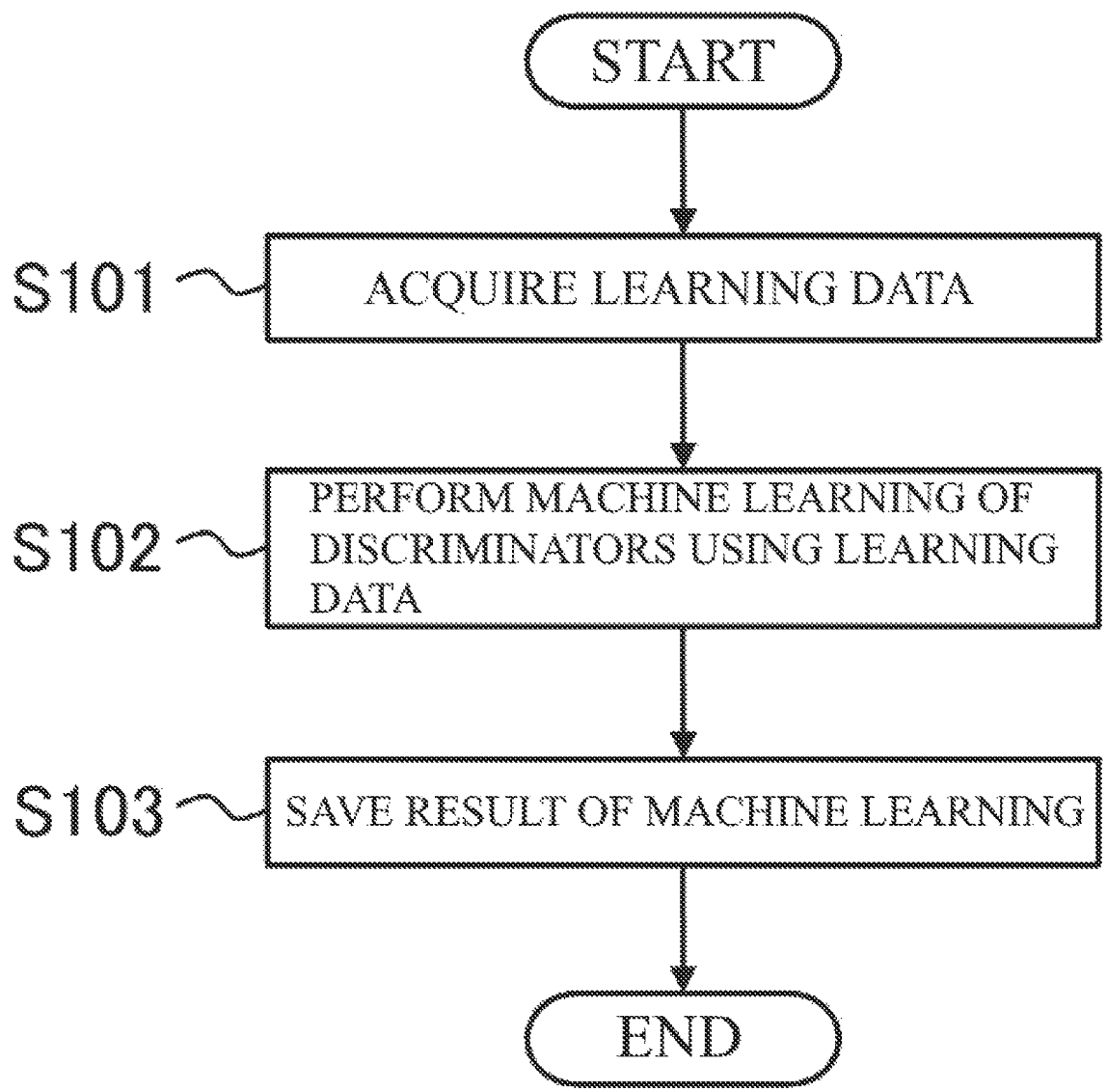
FIG. 6 is a diagram illustrating-illustrates an example of a procedure of a model generation apparatus according to one or more embodiments.

FIG. 6 is a flowchart illustrating an example of a procedure of machine learning of the discriminators 5 performed by the model generation apparatus 2 according to the present embodiment. The procedure to be described in the following is merely an example, and each step may be modified to the extent possible. Moreover, in the procedure described below, steps may also be omitted, replaced, or added as appropriate depending on the embodiment.

(Step S101)

In step S101, the control unit 21 operates as the learning data acquiring unit 211, and acquires learning data 3. In the present embodiment, the learning data 3 is constituted by a plurality of learning data sets 30.

The learning data sets 30 may be generated as appropriate. For example, a scenario in which a task for discriminating feature classes, in a real or virtual space, may be envisioned, and in this scenario, samples of data of the same type as the object data 121 for which the discrimination task is to be executed are acquired as the training data 31. The method for acquiring samples may be selected as appropriate depending on the embodiment. When the data for which the discrimination task is to be executed is sensing data, the training data 31 can be acquired by observing an object with a sensor in various conditions. The object to be observed may be selected according to the feature for which the class is discriminated. Then, the information indicating the result (correct answer) of discriminating the class of a feature included in acquired training data 31 is associated with the training data 31 as the correct answer data 32. The method for discriminating the class of a feature included in training data 31 may be selected as appropriate. For example, the class of a feature included in training data 31 may be manually discriminated by an operator. Alternatively, the class of a feature included in training data 31 may be automatically discriminated by a suitable discriminator. Also, the configuration of the correct answer data 32 is not limited in particular, and may be determined as appropriate depending on the embodiment, as long as the correct answer of the discrimination task can be specified so that the correct answer data 32 can be used in machine learning of at least one of the plurality of discriminators 5. For example, the correct answer data 32 may be constituted by information indicating whether or not each portion of the training data 31 includes a feature of that particular class. Alternatively, the correct answer data 32 may be constituted by information indicating the class of a feature included in each portion of the training data 31.

The learning data sets 30 may be automatically generated by the operation of a computer, or may also be manually generated, in which an operator's action is at least partially included. Also, the learning data sets 30 may be generated by the model generation apparatus 2, or may also be generated by a computer other than the model generation apparatus 2. When the learning data sets 30 are generated by the model generation apparatus 2, the control unit 21 acquires the learning data sets 30 automatically, or by an operator manually executing the generation process described above by manipulating the input apparatus 15. On the other hand, when the learning data sets 30 are generated by another computer, the control unit 21 acquires the learning data sets 30 generated by the other computer via a network, a storage medium 92, or the like. A configuration may also be adopted in which some learning data sets 30 are generated by the model generation apparatus 2, and the other learning data sets 30 are generated by one or more other computers.

The number of learning data sets 30 to be acquired may be selected as appropriate. The learning data 3 may be separately acquired for each discriminator 5. In at least one combination of the plurality of discriminators 5, at least a portion of the learning data 3 to be acquired may be different. Upon acquiring the learning data 3, the control unit 21 advances the processing to the next step S102.

(Step S102)

In step S102, the control unit 21 operates as the learning processing unit 212, and performs machine learning regarding each discriminator 5 using the acquired learning data 3. With this machine learning, the control unit 21 generates a plurality of discriminators 5 that are respectively trained to discriminate the presence of features of different classes.

Specifically, first, the control unit 21 prepares a neural network that constitutes a discriminator 5 regarding which machine learning processing is to be performed. The structure of the neural network (e.g., number of layers, number of neurons included in each layer, connection relationship between neurons in adjacent layers, and the like), the initial values of weights of the connections between neurons, and the initial values of threshold values of the neurons may be given by a template, or may also be given by an operator's input. Also, when relearning is to be performed, the control unit 21 may also prepare a particular discriminator 5 based on learning result data obtained by machine learning performed in the past.

Next, the control unit 21 trains that particular discriminator 5 such that, with respect to each learning data set 30, the result of the discriminator 5 discriminating whether or not the training data 31 includes a feature of the corresponding class matches the correct answer data 32. In this training process, stochastic gradient descent, mini-batch gradient descent, or the like may be used.

For example, the control unit 21 gives the training data 31 to the particular discriminator 5, and executes computation processes of the discriminator 5. That is, the control unit 21 inputs the training data 31 to the input layer 51 of the discriminator 5, and determines, sequentially from the input side, how each of the neurons included in the layers 51 to 53 fires (that is, computation of forward propagation is performed). With the computation processes, the control unit 21 acquires, from the output layer 53, an output value corresponding to the result of discriminating whether or not the training data 31 includes a feature of the corresponding class.

Next, the control unit 21 calculates an error between the output value obtained from the output layer 53 and the correct answer indicated by the correct answer data 32. The error (loss) may be calculated using a loss function. A loss function is a function for evaluating the difference between an output of a machine learning model and a correct answer (that is, degree of difference), and the error value calculated using the loss function increases as the difference between the output value obtained from the output layer 53 and the correct answer increases. The type of the loss function to be used for error calculation is not limited in particular, and may be selected as appropriate depending on the embodiment.

The control unit 21 calculates errors in the values of the computation parameters (e.g., weights of connections between neurons, threshold values of the neurons) of the particular discriminator 5 using the calculated gradient of the error in the output value, using an error back propagation method. The control unit 21 updates the values of the computation parameters of the discriminator 5 using the calculated errors. The degree of updating the values of the computation parameters may be adjusted through the learning rate. The learning rate may be designated by an operator, or given as a setting in the program.

The control unit 21 adjusts, with respect to each learning data set 30, the values of the computation parameters of the particular discriminator 5 such that the sum of the calculated errors decreases, by the series of update processes described above. For example, the control unit 21 may repeat adjustment of the values of the computation parameters of the discriminator 5 by the series of update processes until a predetermined condition such as executing a specified number of times or the sum of the calculated errors being a threshold value or less is satisfied. As a result of this adjustment process, the control unit 21 can generate a trained discriminator 5 that has acquired the capability of discriminating the presence of a feature of the corresponding class with respect to the learning data 3.

The control unit 21 executes the training process for each of the discriminators 5 to acquire the capability of discriminating the presence of a feature of the assigned class. With this, the control unit 21 can generate a plurality of discriminators 5 that are trained to discriminate the presence of features of classes that are different to each other. Upon completing the machine learning of the discriminators 5, the control unit 21 advances the processing to the next step S103.

(Step S103)

In step S103, the control unit 21 operates as the saving processing unit 213, and generates information regarding the trained discriminators 5 generated by machine learning as learning result data 225. Also, the control unit 21 saves the generated sets of learning result data 225 in a predetermined storage area.

The predetermined storage area may be the RAM in the control unit 21, the storage unit 22, an external storage apparatus, or a storage medium, or a combination of these, for example. The storage media may be a CD, a DVD, or the like, and the control unit 21 may store the sets of learning result data 225 in the storage media via the drive 27. The external storage apparatus may be a data server such as a NAS (network attached storage). In this case, the control unit 21 may also store the sets of learning result data 225 in the data server via a network using the communication interface 23. Moreover, the external storage apparatus may also be an external storage apparatus connected to the model generation apparatus 2 via the external interface 24, for example.

Upon completing the saving of the sets of learning result data 225, the control unit 21 ends the procedure regarding this exemplary action.

Note that the generated learning result data 225 may be provided to the analysis apparatus 1 at any timing. For example, the control unit 21 may transfer the learning result data 225 to the analysis apparatus 1 as the process in step S103 or in a process different from the process in step S103. The analysis apparatus 1 may acquire the learning result data 225 by receiving this transfer. Also, the analysis apparatus 1 may also acquire the learning result data 225 by accessing the model generation apparatus 2 or a data server via a network using the communication interface 13, for example. Also, the analysis apparatus 1 may acquire the learning result data 225 via a storage medium 91, for example. Also, the learning result data 225 may be incorporated in the analysis apparatus 1 in advance, for example.

Furthermore, the control unit 21 may update or newly generate the learning result data 225 by regularly or irregularly repeating the processes in steps S101 to S103 described above. During this repetition, at least a portion of the learning data 3 may be changed, modified, added, deleted, or the like, as appropriate. Also, the control unit 21 may update the learning result data 225 retained by the analysis apparatus 1 by providing the updated or newly generated learning result data 225 to the analysis apparatus 1 using any method.

[Analysis Apparatus]

Figure 7:
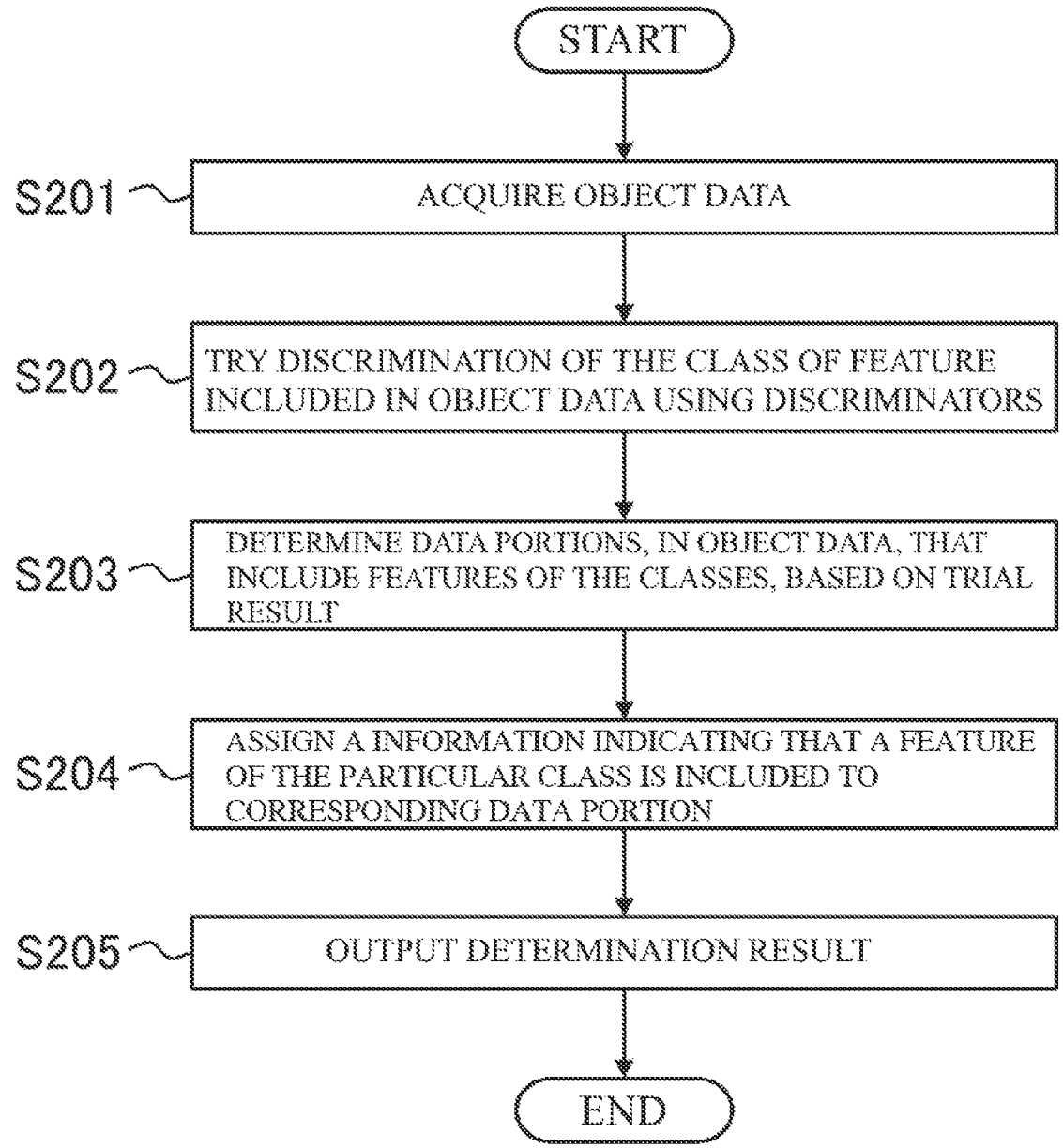
FIG. 7 is a diagram illustrating an example of a procedure of an analysis apparatus according to one or more embodiments.

FIG. 7 is a flowchart illustrating an example of a procedure of the analysis apparatus 1 according to the present embodiment. The procedure described below is an example of the analysis method. Note that the procedures described below are merely examples, and each step may be changed to the extent possible. Moreover, in the procedures described below, steps may also be omitted, replaced, or added as appropriate depending on the embodiment.

(Step S201)

In step S201, the control unit 11 operates as the data acquiring unit 111, and acquires object data 121. The object data 121 is a sample of data of a predetermined type regarding which a discrimination task is to be executed. The method for acquiring the object data 121 may be selected as appropriate depending on the type of the data. When the object data 121 is sensing data, the control unit 11 can acquire the object data 121 by observing, using a sensor, an object in which an event related to the feature whose class is to be discriminated may occur. Upon acquiring the object data 121, the control unit 11 advances the processing to the next step S202.

(Step S202)

In step S202, the control unit 11 operates as the discrimination processing unit 112, refers to the learning result data 225, and performs settings of the plurality of trained discriminators 5 that are respectively configured to discriminate the presence of features of classes that are different to each other. Next, the control unit 11 inputs the acquired object data 121 to the input layers 51 of the discriminators 5, and executes forward propagation computation processes of the discriminators 5. As a result of these computation processes, the control unit 11 can acquire output values corresponding to the results of discriminating whether or not the object data 121 includes features of the corresponding classes from the output layers 53 of the discriminators 5. With this, the control unit 11 identifies the classes of the features included in the acquired object data 121 using the discriminators 5.

(Step S203)

In step S203, the control unit 11 operates as the determining unit 113, and determines the data portions, in the object data 121, that include the features of the respective classes, based on the identification result. The control unit 11 determines that a first data portion, with respect to which discrimination is established by one of the plurality of discriminators 5, but discrimination is not established by the remaining discriminators 5, includes a feature of the particular class that is to be discriminated by the one discriminator. On the other hand, the control unit 11 determines that a second data portion, with respect to which discrimination is established by all of the discriminators 5 including the one discriminator, does not include a feature of that particular class.

Figure 8:
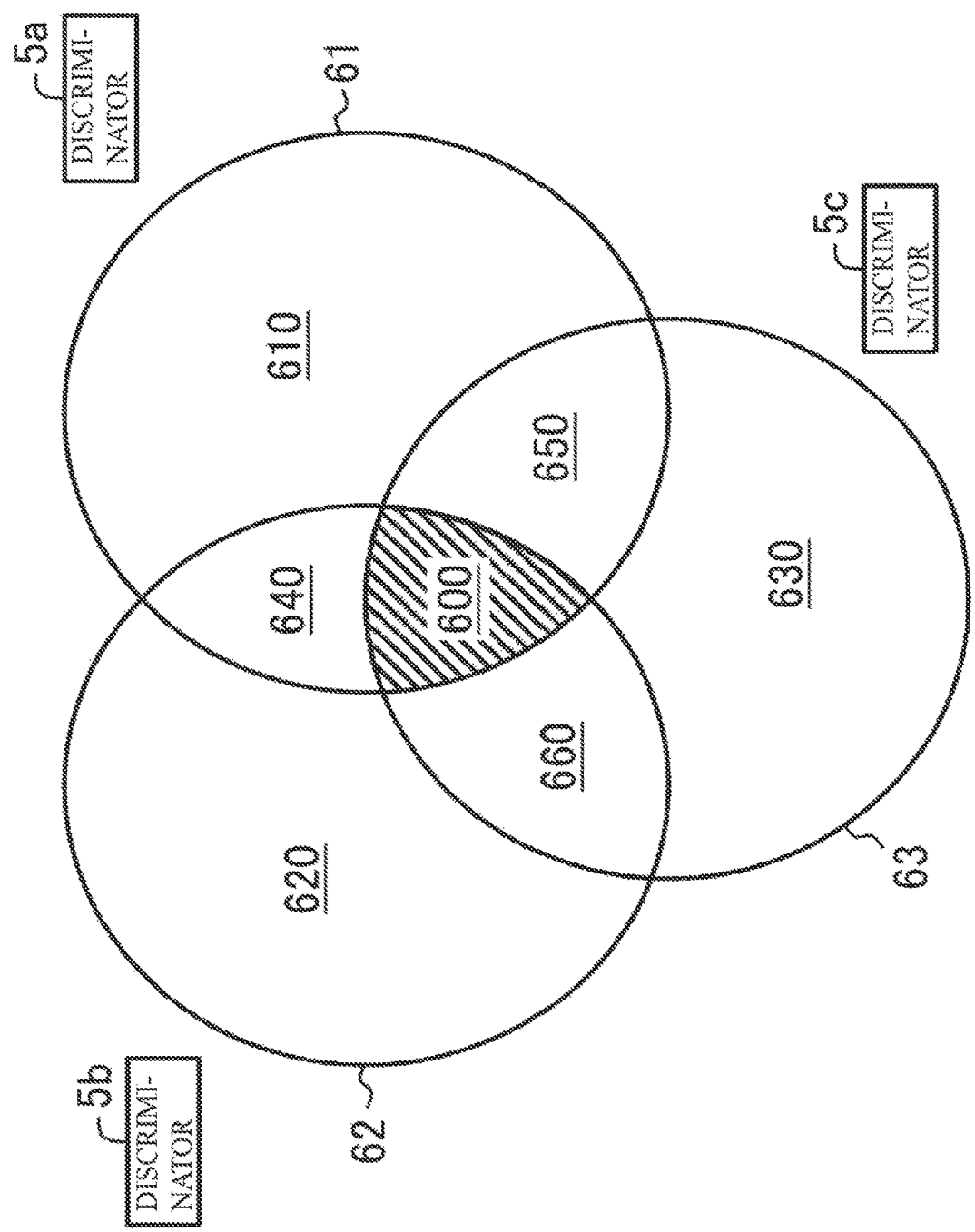
FIG. 8 is a diagram schematically illustrating an example of determination criteria of class discrimination according to one or more embodiments

FIG. 8 illustrates an example of determination criteria for discriminating the classes of features by the discriminators 5 according to the present embodiment. In the example in FIG. 8, it is assumed that three discriminators 5a to 5c are used as the plurality of discriminators 5. In the following, for the sake of description, they are respectively referred to as a first discriminator 5a, a second discriminator 5b, and a third discriminator 5c. The classes respectively discriminated by the discriminators 5a to 5c are referred to as a first class, a second class, and a third class. A range 61 indicates a set of data to be discriminated by the first discriminator 5a where a feature of the first class is present. Similarly, a range 62 indicates a set of data to be discriminated by the second discriminator 5b where a feature of the second class is present. And a range 63 indicates a set of data to be discriminated by the third discriminator 5c where a feature of the third class is present.

In the present embodiment, the control unit 11 determines that a data portion belonging to a range 610, with respect to which discrimination is established by the first discriminator 5a, but discrimination is not established by the remaining discriminators 5 (5b, 5c), includes a feature of the first class. Similarly, the control unit 11 determines that a data portion belonging to a range 620, with respect to which discrimination is established by the second discriminator 5b, but discrimination is not established by the remaining discriminators 5 (5a, 5c), includes a feature of the second class. And the control unit 11 determines that a data portion belonging to a range 630, with respect to which discrimination is established by the third discriminator 5c, but discrimination is not established by the remaining discriminators 5 (5a, 5b), includes a feature of the third class. The data portions belonging to the ranges (610, 620, 630) are examples of the first data portion.

In contrast, the control unit 11 determines that a data portion belonging to a range 600, with respect to which discrimination is established by all of the discriminators 5a to 5c, does not include a feature of the first to third classes. The data portions belonging to the range 600 is an example of the second data portion. How the data portion belonging to this range 600 is to be handled may be determined as appropriate depending on the embodiment. For example, the control unit 11 may determine that an event shared by the features of the first to third classes appears in a data portion belonging to the range 600.

Also, when the number of the discriminators 5 is three or more, a data portion may occur, with respect to which discrimination is established by two or more discriminators of the plurality of discriminators 5, but discrimination is not established by the remaining one or more discriminators. In the example in FIG. 8, data portions belonging to ranges (640, 650, 660) correspond to this data portion. How this data portion is to be handled may also be determined as appropriate depending on the embodiment. For example, the control unit 11 may determine that a transient event between features of the classes for which discrimination is established appears in this data portion. For example, the control unit 11 may determine that a transient event between a feature of the first class and a feature of the second class appears in a data portion belonging to the range 640.

The data portion serving as a unit for discrimination may be a portion or the entirety of object data 121. The data portion may be determined as appropriate depending on the type of object data 121. The object data 121 may include a plurality of elements such as time series data and multi-dimensional data. The time series data includes a plurality of elements arranged in time series. The number of elements per point in time may be any number. Time series data may be sensing data obtained in time series (chronologically) such as moving image data. Multi-dimensional data includes a plurality of elements per point in time. The multi-dimensional data may be moving image data, or still image data, for example. The multi-dimensional data may be obtained by observing the same object using a plurality of different sensors in a synchronized manner. In this case, the types of the sensors may be different. Also, the multi-dimensional data may be constituted by text data in which the same contents are differently expressed (e.g., different phrasings, different dialects, different languages (languages are natural languages, or programming languages, for example)). In this case, the expressions may be handled as different dimensions. The multi-dimensional data may also be referred to as "multiple dimensional data" or the like.

Figure 9A:
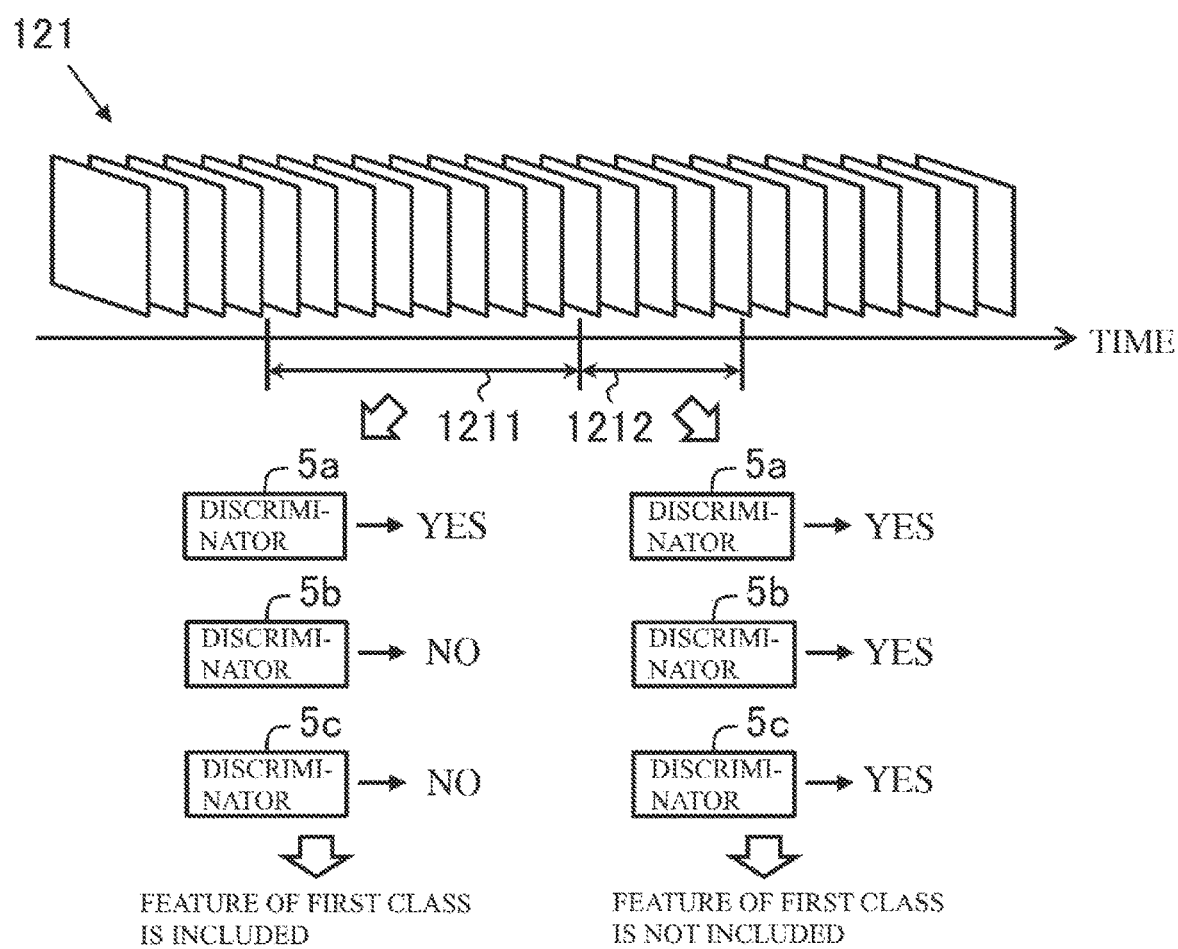
FIG. 9A is a diagram schematically illustrating-illustrates an example of a result of feature class discrimination with respect to time series data.

FIG. 9A schematically illustrates an example of a result of executing feature class discrimination on object data 121 when the object data 121 is time series data. When the object data 121 is time series data, the control unit 11 may determine the time sections of data portions that include features of the respective classes, in the time series data, based on a identification result of the aforementioned discrimination. In the example in FIG. 9A, the control unit 11 determines that the data portion of a time section 1211, with respect to which discrimination is established by the first discriminator 5a, but discrimination is not established by the remaining discriminators (5b, 5c), includes a feature of the first class. On the other hand, the control unit 11 determines that the data portion in a time section 1212, with respect to which discrimination is established by all of the discriminators 5a to 5c including the first discriminator 5a, does not include a feature of the first class.

In this case, the control unit 11 can determine the point in time at which the determination results of the discriminators 5a to 5c regarding the object data 121 enter the ranges (610, 620, 630) from the outside thereof, as the start point of appearance of features of the respective classes. On the other hand, the control unit 11 can determine the point in time at which the determination results of the discriminators 5a to 5c regarding the object data 121 exits the ranges (610, 620, 630) to the outside thereof, as the end point of appearance of features of the respective classes.

Figure 9B:
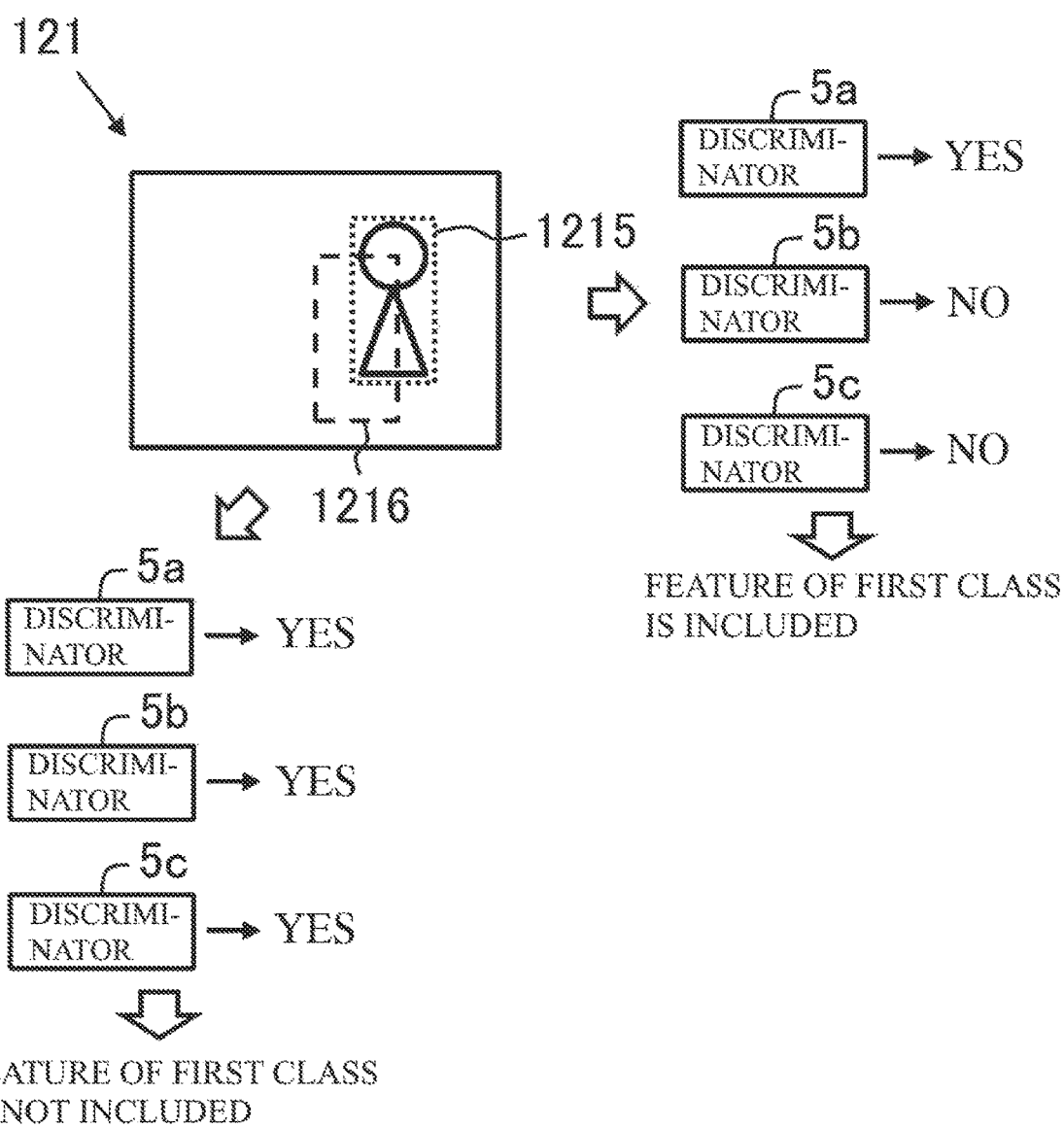
FIG. 9B is a diagram schematically illustrating-illustrates an example of a result of feature class discrimination with respect to multi-dimensional data.

FIG. 9B schematically illustrates an example of a result of executing feature class discrimination on object data 121 when the object data 121 is multi-dimensional data. When the object data 121 is multi-dimensional data, the control unit 11 may determine the ranges of data portions including features of the respective classes, in the multi-dimensional data, based on a identification result of the aforementioned discrimination/identification. In the example in FIG. 9B, the control unit 11 determines that the data portion of a range 1215, with respect to which discrimination is established by the first discriminator 5a, but discrimination is not established by the remaining discriminators (5b, 5c), includes a feature of the first class. On the other hand, the control unit 11 determines that the data portion in a range 1216, with respect to which discrimination is established by all of the discriminators 5a to 5c including the first discriminator 5a, does not include a feature of the first class.

Accordingly, the control unit 11 can determine the data portions including features of the respective classes, in the object data 121, based on the identification results of discrimination. Upon completing the determination process, the control unit 11 advances the processing to the next step S204.

(Step S204)

In step S204, the control unit 11 operates as the assignment unit 114, and assigns a label indicating the determination result to the object data 121. The control unit 11 assigns a label indicating that a feature of the particular class is included to the first data portion. In the example in FIG. 8 described above, the control unit 11 assigns labels indicating that features of the respective classes are included to data portions respectively belonging to the ranges (610, 620, 630).

Any labels may be assigned to other data portions as appropriate. For example, assigning labels to other data portions may be omitted. Alternatively, the control unit 11 may also assign, to a data portion (data portion belonging to the range 600, in the example in FIG. 8), with respect to which discrimination is established by all of the discriminators 5, a label indicating that an event shared by features of all of the classes appears. Also, the control unit 11 may assign, to a data portion (data portions belonging to the respective ranges (640, 650, 660), in the example in FIG. 8), with respect to which discrimination is established by two or more discriminators of a plurality of discriminators 5, but discrimination is not established by the remaining one or more discriminators, a label indicating that a transient event between features of the respective classes appears.

Upon generating labeled object data 121, the control unit 11 advances the processing to the next step S205.

(Step S205)

In step S205, the control unit 11 operates as the output unit 115, and outputs information regarding the result of discriminating the class of a feature included in object data 121.

The output destination and information details to be output may be determined as appropriate depending on the embodiment. For example, the control unit 11 may output the result of discriminating, in steps S202 and S203, the class of a feature included in object data 121 to the output apparatus 16 as is. When the discriminators 5 are configured to output the probabilities of belonging to the corresponding classes, the control unit 11 may output the values of probabilities of belonging to their classes that are obtained from the discriminators 5 to the output apparatus 16 as the result of this discrimination. Also, the control unit 11 may execute some information process based on the result of discriminating the class of a feature. Then, the control unit 11 may output the result of executing the information process as the information regarding the result of class discrimination. Outputting the result of executing the information process may include outputting a specific message depending on the discrimination result, controlling the operation of an apparatus to be controlled according to the discrimination result, or the like. The output destination may be the output apparatus 16, an output apparatus of another computer, an apparatus to be controlled, or the like. Also, the control unit 11 may save the labeled object data 121 generated in step S204 in a predetermined storage area, as an output process in step S205, for example. The predetermined storage area may be the RAM in the control unit 11, the storage unit 12, an external storage apparatus, or a storage medium, or a combination of these, for example.

Upon completing outputting the information regarding the result of class discrimination, the control unit 11 ends the procedure regarding this exemplary action. Note that the control unit 11 may continuously and repeatedly execute the series of information processes in steps S201 to S205 for a predetermined period of time. The repetition timing may be determined as appropriate. With this, the analysis apparatus 1 may continuously execute the task of discriminating the feature on object data 121.

[Features]

As described above, in the present embodiment, a trained discriminator 5 is generated for each class to be discriminated, by the processes in steps S101 to S103 described above. In step S203 described above, first data portions, with respect to which discrimination is established by one of the plurality of discriminators 5, but discrimination is not established by the remaining discriminators 5, are determined to include a feature of the class to be discriminated by that one discriminator. On the other hand, second data portions, with respect to which discrimination is established by all of the discriminators 5 including the one discriminator, are determined to not include a feature of the class to be discriminated by that one discriminator. With this discrimination process, data portions in which merely an event occurs that is shared by features of the respective classes and that does not truly include a feature of a particular class can be prevented from being erroneously discriminated to include a feature of that particular class, as described above. Therefore, according to the present embodiment, the accuracy of discriminating the classes of features included in the data can be improved.

Also, in the present embodiment, object data 121 to which labels that appropriately indicate the classes of features included in the respective portions are appended can be generated, in step S204 described above. The labeled object data 121 may be used in machine learning for acquiring the capability of discriminating the classes of features included in the data of the same type as the object data 121. The labels that are assigned appropriately indicate the classes of features included in the object data 121, and therefore high quality learning data can be provided with the labeled object data 121.

4. MODIFICATIONS

Although an embodiment of the present invention has been described above in detail, the above descriptions are merely examples of the present invention in all aspects. Needless to say, various improvements and modifications can be made without departing from the scope of the present invention. For example, the following modifications are possible. Note that, in the following description, the same constituent elements as the constituent elements described in the above embodiment are assigned the same reference numerals, and descriptions of the same points as the points described in the above embodiment are omitted as appropriate. The following modifications may be combined as appropriate.

<4.1>

The analysis system 100 according to the embodiment may be applied to any scenario in which the class of some feature included in data is discriminated. The analysis system 100 according to the embodiment described above may be applied to a scenario in which the type of action of a person is discriminated, a scenario in which the type of work process in a production line is discriminated, a scenario in which the class of a state of a person is discriminated, and the like. In the following, modifications in which the application scenario is limited will be illustrated.

(A) Scenario of Discriminating the Action Type of Persons

Figure 10:
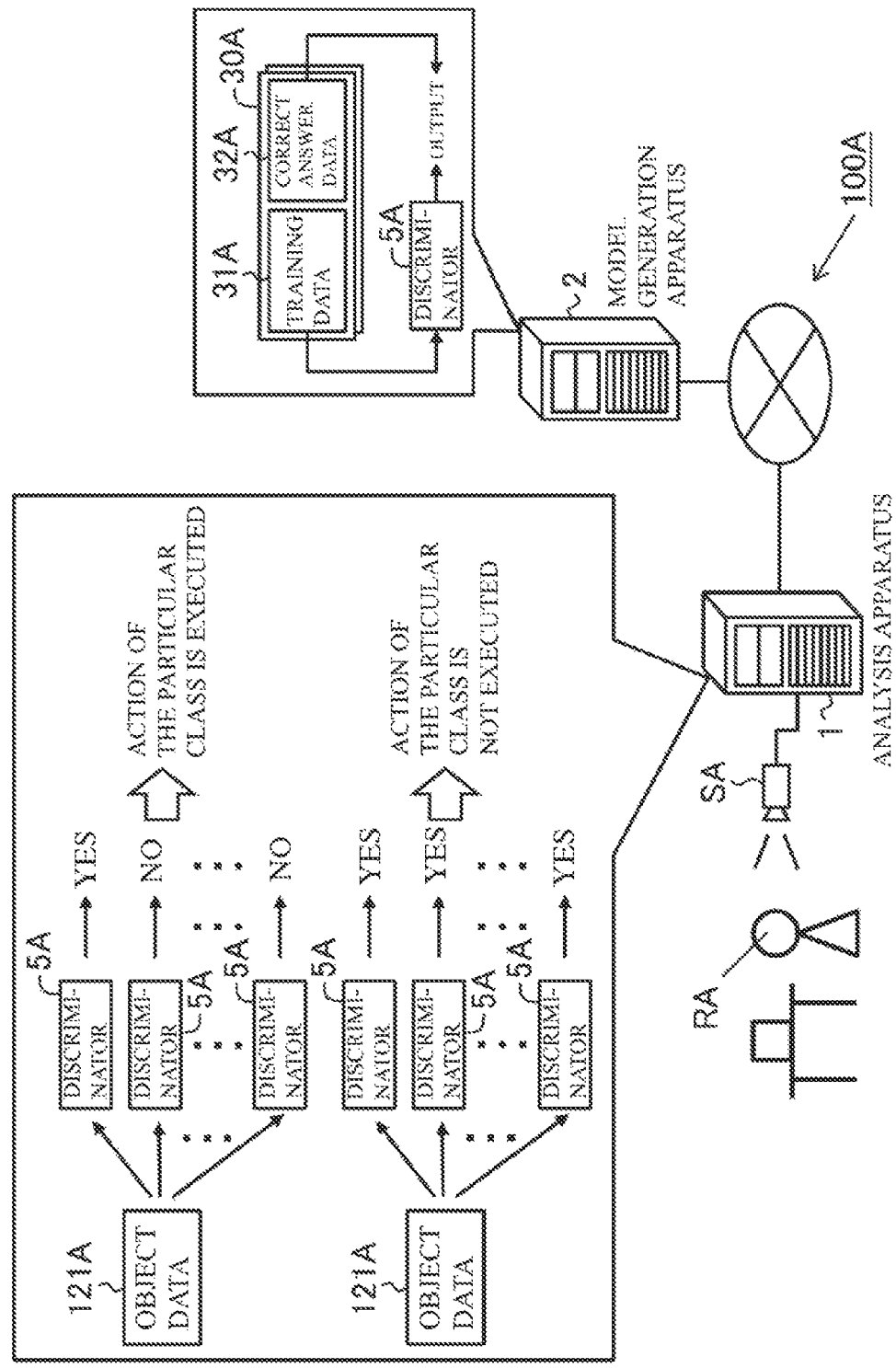
FIG. 10 is a diagram schematically illustrating an example of another scenario to which one or more embodiments is applied.

FIG. 10 schematically illustrates an example of the application scenario of an action analysis system 100A according to a first modification. This modification is an example in which the embodiment described above is applied to a scenario in which the type of action of a person RA is discriminated using sensing data obtained by a sensor SA that observes the action of the person RA. The action type is an example of a feature class.

In this modification, the sensing data obtained by the sensor SA is handled as object data and training data. The actions and types that are to be discriminated may be determined as appropriate depending on the embodiment. The actions to be discriminated may be simple actions such as raising a hand and turning the face sideward. Alternatively, the actions to be discriminated may also be a set of actions such as actions related to some work in a factory, for example. In this case, the actions to be discriminated may also be related to different types of processes in a production line. Also, the action types may be set depending on the work types, operator's attributes, or action qualities, for example. The work types may include basic action types such as visual recognition, holding, conveyance, and adjustment, for example. The operator's attributes may include an operator identifier (or name), length of service, proficiency, state (e.g., health degree, or fatigue degree), for example. The operator's attributes may be set for each individual, or may also be set for groups of one or more individuals. The sensor SA may be a camera, an acceleration sensor, an action sensor, a pressure sensor, or a microphone, for example. The camera may be a common RGB camera, a depth camera, or an infrared camera, for example. The action analysis system 100A according to this modification may be configured similarly to the analysis system 100 according to the embodiment described above, except for these restrictions.

(Model Generation Apparatus)

In this modification, the control unit 21 of the model generation apparatus 2 acquires learning data constituted by a plurality of learning data sets 30A, in step S101 described above. Each learning data set 30A is constituted by a combination of training data 31A and correct answer data 32A. The training data 31A can be obtained by observing the action of an examinee using the sensor SA or a sensor of the same type. The correct answer data 32A indicates the correct answer of an action discrimination task with respect to the training data 31A.

The control unit 21 generates a plurality of trained discriminators 5A that are respectively configured to discriminate executions of different types of actions of the examinee as presence of features, by performing the machine learning in step S102 described above using the acquired learning data. The control unit 21 generates information regarding the generated trained discriminators 5A as learning result data, in the process in step S103 described above, and saves the generated learning result data in a predetermined storage area. The generated learning result data may be provided to the analysis apparatus 1 at any timing.

(Analysis Apparatus)

In this modification, the analysis apparatus 1 may be connected to the sensor SA via the communication interface 13 or the external interface 14. The sensor SA may be arranged, as appropriate, at a place from which the action of the person RA can be observed. The control unit 11 acquires object data 121A from the sensor SA, in step S201 described above. The object data 121A may be at least one of time series data and multi-dimensional data. The control unit 11 identifies the type of action that appears in the acquired object data 121A using the discriminators 5A, in the process in step S202 described above.

In step S203 described above, the control unit 11 determines the data portions, in the object data 121A, in which executions of the respective types of actions appear, based on the identification result. The control unit 11 determines that, in a first data portion with respect to which discrimination is established by one of the plurality of discriminators 5A, but discrimination is not established by the remaining discriminators, execution of an action of the type to be discriminated by the one discriminator appears. On the other hand, the control unit 11 determines that execution of a particular action does not appear in a second data portion with respect to which discrimination is established by all of the discriminators 5A including the one discriminator.

For example, a scenario is assumed in which the person RA is a factory operator, and four actions of the operator, namely visual recognition, holding, conveyance, and adjustment, are discriminated by four discriminators 5A. In this case, the control unit 11 may determine that, in a second data portion with respect to which discrimination is established by all of the discriminators 5A, a motion shared by all of the actions appears, and no type of action is executed at the point in time at which the data portion is obtained. On the other hand, the control unit 11 can determine that, in a data portion with respect to which discrimination is established by only one of the discriminators 5A, a motion specific to the action of the corresponding type appears, and an action of the corresponding type is executed at the point in time at which the data portion is obtained.

Also, a scenario is assumed in which two discriminators 5A for respectively discriminating actions of a skilled person and a beginner are prepared, for example. In this case, the control unit 11 can determine that, in a second data portion with respect to which discrimination is established by the two discriminators 5A, execution of an action shared by the skilled person and the beginner appears. On the other hand, the control unit 11 can determine that, in a data portion with respect to which discrimination is established only by the discriminator 5A corresponding to the skilled person, execution of an action specific to the skilled person appears. Similarly, the control unit 11 can determine that, in a data portion with respect to which discrimination is established only by the discriminator 5A corresponding to the beginner, execution of an action specific to the beginner appears.

In step S204 described above, the control unit 11 assigns a label indicating the determination result to the object data 121A. The control unit 11 assigns a label indicating that execution of a particular action appears, to the first data portion.

In step S205 described above, the control unit 11 outputs information regarding the result of discriminating the type of action of the person RA that appears in the object data 121A. For example, the control unit 11 may output the result of discriminating the type of action of the person RA to the output apparatus 16 as is. The discrimination result may be expressed by probabilities of execution of actions of the respective types.

(Features)

In this modification, a data portion in which merely an event occurs that is shared by actions of the respective types and a particular action is not truly executed can be prevented from being erroneously discriminated as a particular action. Therefore, according to this modification, the accuracy of discriminating the type of action of the person RA that appears in data can be improved. Note that, in this modification, the actions to be discriminated are not limited to the actions of a person. The actions to be discriminated may include actions of a machine such as an industrial robot, or mobile robot (e.g., drone). In this case, the actions to be discriminated may include actions in which a machine and a person cooperate. Also, the action types may include whether or not the action of a machine is proper, or the state of a machine (e.g., normal or failed, or a failure degree), for example.

(B) Scenario of Discriminating the State of Drivers

Figure 11:
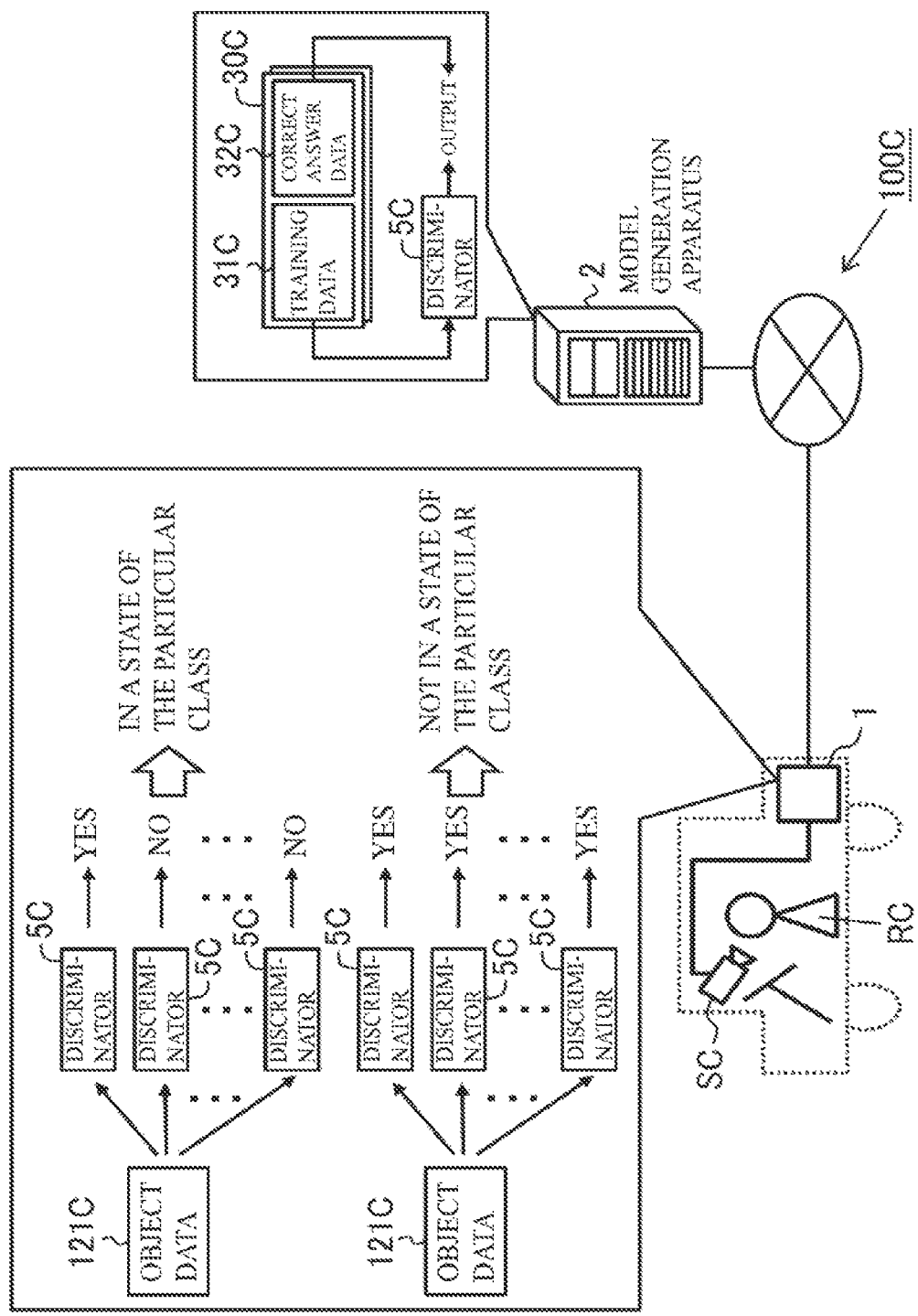
FIG. 11 is a diagram schematically illustrating an example of another scenario to which one or more embodiments is applied.

FIG. 11 schematically illustrates an example of the application scenario of a state analysis system 100C according to a second modification. This modification is an example in which the embodiment described above is applied to a scenario in which the class of the state of a driver RC is discriminated using sensing data obtained by a sensor SC that observes the driver RC who drives a vehicle. The state of the driver RC is an example of a feature. The driver RC is an example of a person.

In this modification, the sensing data obtained by the sensor SC is handled as object data and training data. The states and classes to be discriminated may be determined as appropriate depending on the embodiment. The states to be discriminated may include behavior of a driver, health status, sleepiness degree, fatigue degree, and margin of capability, for example. Also, the classes of the state may be set according to the type of behavior, the type of health status, the sleepiness degree, the fatigue degree, and the margin of capability, for example. The sensor SC may be a camera, or a vital sensor, for example. The vital sensor may be a blood-pressure gauge, a pulsimeter, a heart rate meter, an electrocardiographic monitor, an electromyograph, a clinical thermometer, an electro dermal activity sensor, a microwave sensor, an electroencephalograph, a magnetoencephalograph, an activity tracker, a glucometer, an ocular potentiometer, or an eye movement measuring instrument, for example. The state analysis system 100C according to this modification may be similarly configured to the analysis system 100 according to the embodiment described above, except for these restrictions.

(Model Generation Apparatus)

In this modification, the control unit 21 of the model generation apparatus 2 acquires learning data constituted by a plurality of learning data sets 30C, in step S101 described above. Each learning data set 30C is constituted by a combination of training data 31C and correct answer data 32C. The training data 31C can be obtained by observing an examinee who drives a vehicle using the sensor SC or a sensor of the same type. The correct answer data 32C indicates the correct answer of a state discrimination task with respect to the training data 31C.

The control unit 21 generates a plurality of trained discriminators 5C that are respectively configured to discriminate appearances of states of different classes as presence of features, by performing machine learning in step S102 described above using the acquired learning data. The control unit 21 generates information regarding the generated trained discriminators 5C as learning result data, in the process in step S103 described above, and saves the generated learning result data in a predetermined storage area. The generated learning result data may be provided to the analysis apparatus 1 at any timing.

(Analysis Apparatus)

In this modification, the analysis apparatus 1 may be connected to the sensor SC via the communication interface 13 or the external interface 14. The sensor SC may be arranged, as appropriate, at a place from which the state of the driver RC can be observed. The control unit 11 acquires object data 121C from the sensor SC, in step S201 described above. The object data 121C may be at least one of time series data and multi-dimensional data. The control unit 11 identifies the class of a state that appears in the acquired object data 121C using the discriminators 5C, in the process in step S202 described above.

In step S203 described above, the control unit 11 determines the data portions, in the object data 121C, in which states of the respective classes appear, based on the identification result. The control unit 11 determines that, in first data portions with respect to which discrimination is established by one of the plurality of discriminators 5C, but discrimination is not established by the remaining discriminators, a state of the class to be discriminated by the one discriminator appears. On the other hand, the control unit 11 determines that a state of the particular class does not appear in second data portions with respect to which discrimination is established by all of the discriminators 5C including the one discriminator.

In step S204 described above, the control unit 11 assigns a label indicating the determination result to the object data 121C. The control unit 11 assigns a label indicating that a state of the particular class appears, to the first data portion.

In step S205 described above, the control unit 11 outputs information regarding the result of discriminating the class of state of the driver RC that appears in the object data 121C. For example, the control unit 11 may output the result of discriminating the class of state of the driver RC to the output apparatus 16 as is. Also, the control unit 11 may output a specific message such as a warning to the output apparatus 16, according to the state of the driver RC to be discriminated, for example. For example, when the class of at least one of the sleepiness degree and the fatigue degree is discriminated, the control unit 11 may output a warning for prompting the driver RC to park in a parking area or the like and take a rest, from the output apparatus 16, in response to the state of the driver RC being discriminated as a class in which at least one of the sleepiness degree and the fatigue degree is high.

Also, if a vehicle includes a control apparatus (not illustrated) for controlling the action of autonomous driving, the control unit 11 may transmit an instruction for instructing the action of the autonomous driving of the vehicle to the control apparatus based on the result of discriminating the class of state of the driver RC, for example. Assume that the vehicle is configured to be switchable between an autonomous driving mode in which the movement of the vehicle is controlled by the control apparatus and a manual driving mode in which the movement of the vehicle is controlled by steering performed by the driver RC, for example. In this case, when the control unit 11 has received an instruction to switch from the autonomous driving mode to the manual driving mode from the driver RC or the system while the vehicle is driving in the autonomous driving mode, the control unit 11 may determine whether or not the state of the driver RC is discriminated to be in a class in which the margin of capability is high. Then, if the state of the driver RC is discriminated to be in the class in which the margin of capability is high, the control unit 11 may transmit an instruction for permitting switching from the autonomous driving mode to the manual driving mode to the control apparatus. On the other hand, if the state of the driver RC is discriminated to be in the class in which the margin of capability is low, the control unit 11 may transmit an instruction for not permitting switching from the autonomous driving mode to the manual driving mode to the control apparatus, and keep moving in the autonomous driving mode.

Also, when the vehicle is driving in the manual driving mode, the control unit 11 may also determine whether or not the state of the driver RC is discriminated to be in a class in which at least one of the sleepiness degree and the fatigue degree is high. Then, if the state of the driver RC is discriminated to be in the class in which at least one of the sleepiness degree and the fatigue degree is high, the control unit 11 may also transmit an instruction for instructing to switch from the manual driving mode to the autonomous driving mode and stop at a safe location such as a parking area to the control apparatus. On the other hand, if not, the control unit 11 may also keep driving the vehicle in the manual driving mode.

Also, when the vehicle is moving in the manual driving mode, the control unit 11 may also determine whether or not the state of the driver RC is discriminated to be in a class in which the margin of capability is low. Then, if the state of the driver RC is discriminated to be in a class in which the margin of capability is low, the control unit 11 may also transmit an instruction for deceleration to the control apparatus. On the other hand, if not, the control unit 11 may also keep the vehicle to move by the action of the driver RC. Note that, in this modification, the control apparatus of the vehicle and the analysis apparatus 1 may be constituted by one computer.

(Features)

In this modification, a data portion in which an event shared by states of the respective classes merely occurs and a state of the particular class does not truly appears can be prevented from being erroneously discriminated that a state of the particular class appears. Therefore, according to this modification, the accuracy of discriminating the class of state of the driver RC that appears in the data can be improved.

(C) Scenario of Discriminating the Class of Health Status

Figure 12:
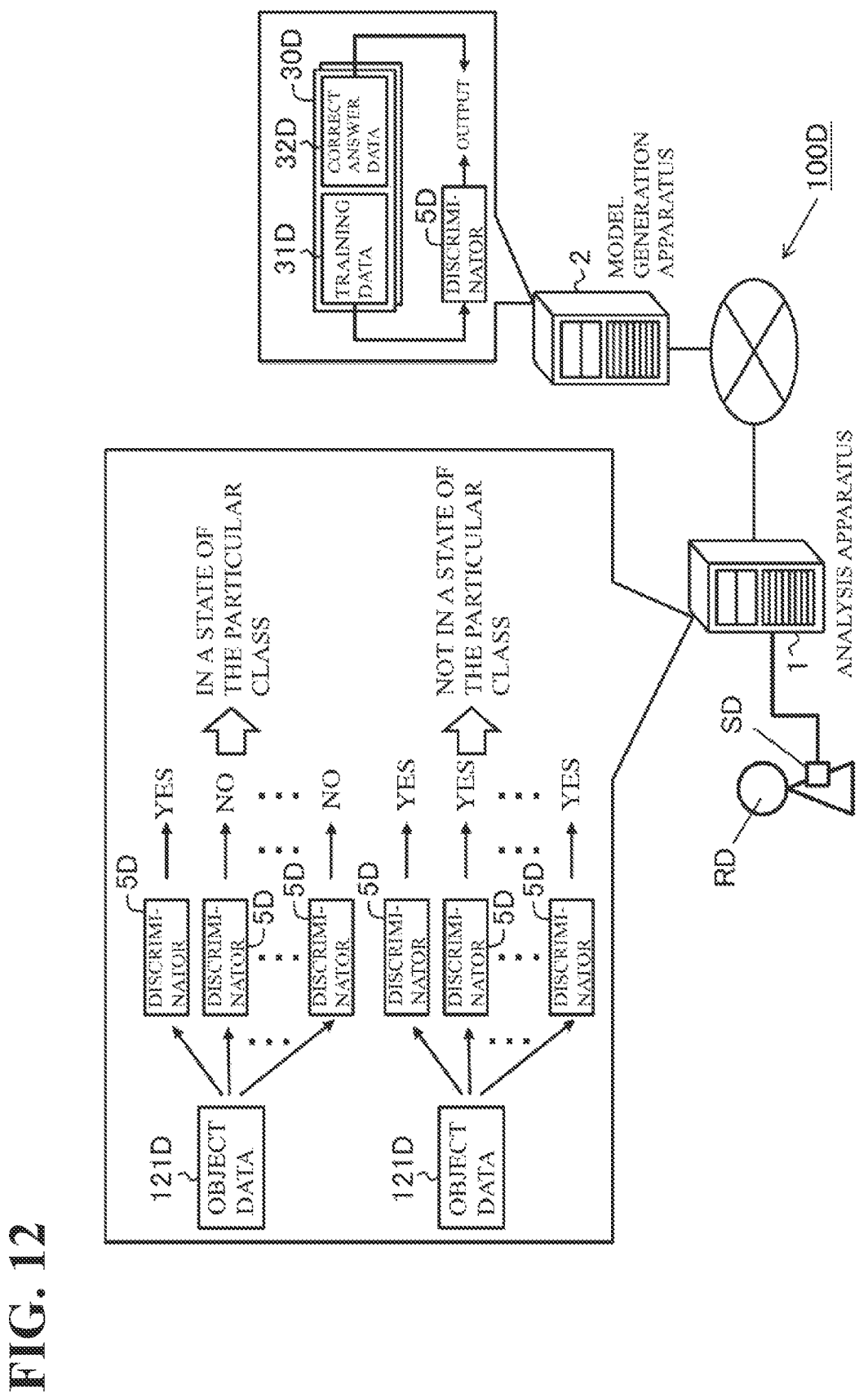
FIG. 12 is a diagram schematically illustrating-illustrates an example of another scenario to which one or more embodiments is applied.

FIG. 12 schematically illustrates an example of the application scenario of a state analysis system 100D according to a third modification. This modification is an example in which the embodiment described above is applied to a scenario in which classes of health status of a person RD are discriminated using sensing data obtained by a sensor SD that observes the health status of the person RD. The health status is an example of a feature.

In this modification, the sensing data obtained by the sensor SD is handled as object data and training data. The health status and classes to be discriminated may be determined as appropriate depending on the embodiment. The health statuses to be discriminated may be health statuses regarding a specific disease that can be estimated from sensing data to be obtained, for example. The classes of health status may be set depending on whether the person is healthy or not, whether or not there is a sign of falling ill, the type of disease that is estimated to appear or currently appears, or whether or not the disease is expected to be remedied by administrating specific medicine or by implementing a specific method of treatment, for example. The sensor SD may be a camera, a vital sensor, or a medical examination apparatus, for example. The medical examination apparatus may be a CT apparatus, or an MRI apparatus, for example. The state analysis system 100D according to this modification may be similarly configured to the analysis system 100 according to the embodiment described above, except for these restrictions.

(Model Generation Apparatus)

In this modification, the control unit 21 of the model generation apparatus 2 acquires learning data constituted by a plurality of learning data sets 30D, in step S101 described above. Each learning data set 30D is constituted by a combination of training data 31D and correct answer data 32D. The training data 31D can be obtained by observing the health status of an examinee using the sensor SD or a sensor of the same type. The correct answer data 32D indicates the correct answer of a health status discrimination task with respect to the training data 31D.

The control unit 21 generates a plurality of trained discriminators 5D that are respectively configured to discriminate appearances of health statuses of different classes as presence of features, by performing machine learning in step S102 described above using the acquired learning data. The control unit 21 generates information regarding the generated trained discriminators 5D as learning result data, in the process in step S103 described above, and saves the generated learning result data in a predetermined storage area. The generated learning result data may be provided to the analysis apparatus 1 at any timing.

(Analysis Apparatus)

In this modification, the analysis apparatus 1 may be connected to the sensor SD via the communication interface 13 or the external interface 14. The sensor SD may be arranged, as appropriate, at a place from which the health status of the person RD can be observed. The control unit 11 acquire object data 121D from the sensor SD, in step S201 described above. The object data 121D may be at least one of time series data and multi-dimensional data. The control unit 11 identifies the classes of health status that appear in the acquired object data 121D using the discriminators 5D, in the process in step S202 described above.

In step S203 described above, the control unit 11 determines the data portions, in the object data 121D, in which health statuses of the respective classes appear, based on the identification result. The control unit 11 determines that, in first data portions with respect to which discrimination is established by one of the plurality of discriminators 5D, but discrimination is not established by the remaining discriminators, a health status of the class to be discriminated by the one discriminator appears. On the other hand, the control unit 11 determines that a health status of the particular class does not appear in second data portions with respect to which discrimination is established by all of the discriminators 5D including the one discriminator.

In step S204 described above, the control unit 11 assigns labels indicating the determination result to the object data 121C. The control unit 11 assigns labels indicating that a health status of a particular class appears, to the first data portions.

In step S205 described above, the control unit 11 outputs information regarding the result of discriminating the class of health status of the person RD that appears in the object data 121D. For example, the control unit 11 may output the result of discriminating the class of health status of the person RD to the output apparatus 16 as is. Also, when the class of health status that is discriminated corresponds to the presence of a sign of predetermined disease, the control unit 11 may output a message prompting to receive examination at a hospital, to the output apparatus 16, for example. Also, the control unit 11 may also transmit the result of discriminating the class of health status of the person RD to a terminal of a registered hospital, for example. Note that the information regarding a terminal to which information is to be transmitted may be stored in a predetermined storage area such as a RAM, a ROM, the storage unit 12, a storage medium 91, or an external storage apparatus.

(Features)

In this modification, data portions in which merely an event occurs that is shared by health statuses of the respective classes and a health status of a particular class does not truly appear can be prevented from being erroneously discriminated as a health status of that particular class. Therefore, according to this modification, the accuracy of discriminating the class of health status of the person RD that appears in data can be improved.

<4.2>

In the embodiments described above, fully connected neural networks are used for the discriminators 5. However, the type of neural networks constituting the discriminators 5 is not limited to this example. For example, convolutional neural networks, recurrent neural networks, or the like may be used for the discriminators 5. Also, the type of machine learning model that configures the discriminators 5 is not limited to neural networks. A support vector machine, a regression model, or a decision tree model may be used for the discriminators 5, instead of a neural network, for example. A rule-based model may be used for the discriminator 5, in addition to the machine learning model. The discriminators 5 may also be configured by a combination of the machine learning model and the rule-based model. The configuration of the discriminators 5 is not limited in particular, as long as it is able to discriminate the classes of features, and may be determined as appropriate depending on the embodiment. The configuration of the learning data may be determined as appropriate depending on the configuration of the discriminators 5.

Also, in the embodiment described above, the formats of input and output of the discriminators 5 are not limited in particular, and may be determined as appropriate depending on the embodiment. For example, the discriminators 5 may also be configured to further receive an input of information in addition to the object data 121. The discriminators 5 may also be configured to further output information in addition to the result of discriminating the class of a feature. The form in which the result of discriminating the class of a feature is expressed is not limited in particular, and may be determined as appropriate depending on the embodiment. Discriminating the presence of a feature of a particular class may include regressing the probability that a feature of the particular class is present and determining whether or not a feature of the particular class is present based on the obtained probability.

Also, in the embodiments described above, when the structures of the discriminators 5 (discriminators 5a to 5c, in the example in FIG. 8) are at least partially shared, at least a portion of the computation parameters may be shared by the discriminators 5. When the structures of the discriminators 5 are the same, a portion or all of the computation parameters of the discriminators 5 may be shared between the discriminators 5. When all of the computation parameters of the discriminators 5 are shared, a single discriminator may operate as all the discriminators 5. In this case, the input layer of the single discriminator may be configured to further receive information indicating the classes to be discriminated, such as a one-hot vector (that is, as which of the discriminators 5 the one discriminator is supposed to operate).

Also, in the embodiment described above, the discriminators 5 are each configured to receive an input of object data 121, and directly output the result of discriminating the class of a feature. However, the mode of discriminating the class of a feature included in object data 121 using the discriminators 5 is not limited to this example. As another example, the discriminators may be configured to generate generation data including features of corresponding classes. In this case, the classes of features included in object data 121 can be discriminated by comparing the generation data generated by the discriminators and the object data 121.

Figure 13:
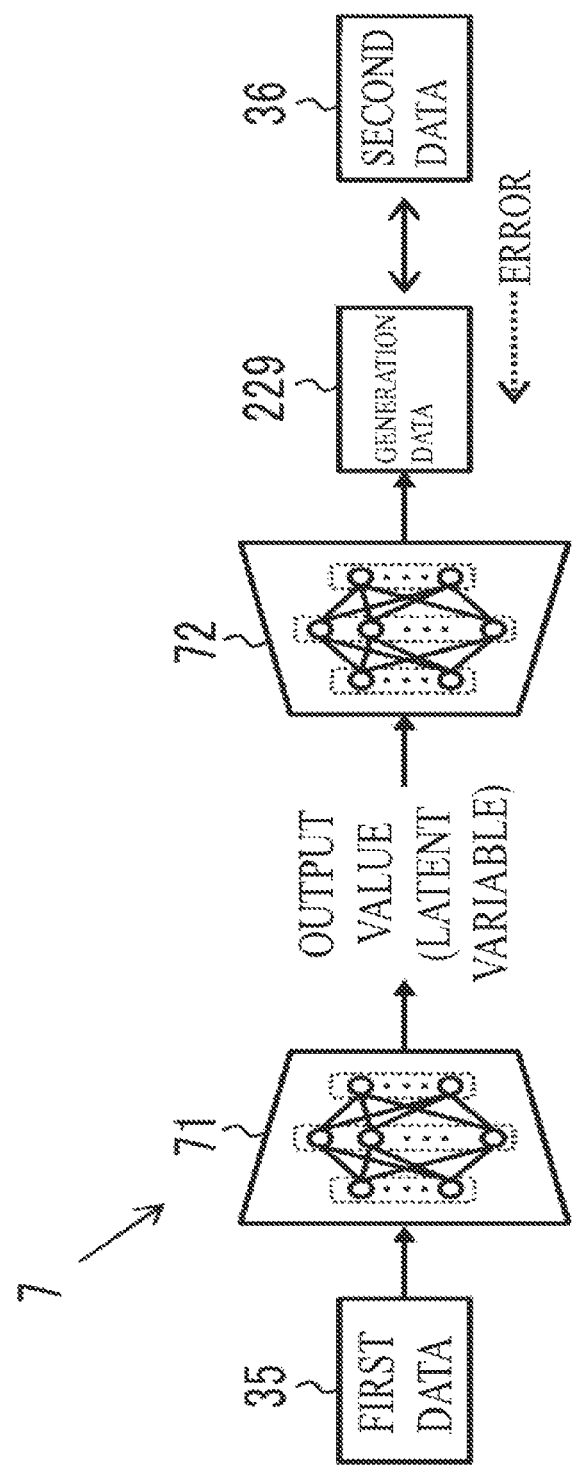
FIG. 13 is a diagram schematically illustrating an example of a training scenario of a discriminator according to another embodiment or embodiments.

FIG. 13 schematically illustrates an example of a training scenario of discriminators 7 according to this modification. Discriminators 7 according to this modification are configured to generate, from first data 35 that includes features of classes to be discriminated, second data 36 of the same type as object data 121 that include features of the same classes to be discriminated. As an exemplary configuration, each discriminator 7 includes an encoder 71 and a decoder 72. The encoder 71 is configured to covert first data 35 to feature amounts (latent variables). The decoder 72 is configured to generate second data 36 from the feature amounts. The format of the feature amounts is not limited in particular, and may be determined as appropriate. The encoder 71 and decoder 72 are configured by models that are capable of machine learning. The types of the machine learning models may be selected as appropriate. Neural networks may be used for the encoder 71 and decoder 72, similarly to the discriminators 5 described above.

In this modification, the control unit 21 of the model generation apparatus 2 acquires, in step S101 described above, learning data constituted by a combination of first data 35 and second data 36. The first data 35 and second data 36 that include features of the classes to be discriminated by the respective discriminator 7 are acquired. If the same event is captured, data of a different type can be generated from any data. Therefore, the first data 35 may be data that captures the same event as the second data 36 but is of a different type from the second data 36. For example, a scenario may be envisioned in which the action of an examinee is observed by a camera and by a motion sensor. In this case, the first data 35 may be obtained by one of the camera and the motion sensor, and the second data 36 may be obtained by the other of the camera and the motion sensor. Alternatively, the first data 35 and the second data 36 may also be data of the same type. That is, the first data 35 and the second data 36 may be the same signal. In this case, the learning data is constituted by single (unitary) data.

In step S102 described above, the control unit 21 executes machine learning on each discriminator 7 using corresponding learning data. The method of machine learning may be selected as appropriate depending on the configuration of the discriminators 7. For example, when the encoder 71 and the decoder 72 are constituted by neural networks, the control unit 21 inputs first data 35 that includes a feature of the corresponding class to be discriminated to the encoder 71, and executes the computation process of the encoder 71. With this, the control unit 21 acquires an output value corresponding to the result of converting the first data 35 to a feature amount, from the encoder 71. Next, the control unit 21 inputs the feature amount obtained from the encoder 71 to the decoder 72, and executes the computation process of the decoder 72. With this, the control unit 21 acquires an output value corresponding to generation data 229 generated from the feature amount, from the decoder 72.

The control unit 21 calculates an error between the obtained generation data 229 and the second data 36. The control unit 21 calculates, using back propagation, errors in values of the computation parameters of the encoder 71 and decoder 72, using a gradient of the calculated error. The control unit 21 updates the values of the computation parameters of the encoder 71 and decoder 72, using the calculated errors. The control unit 21 adjusts the values of the computation parameters of the encoder 71 and decoder 72 such that the sum of the calculated errors decreases, with the series of update processes.

As a result of the machine learning described above, the control unit 21 can generate a trained discriminator 7 that has acquired the capability of generating, from first data 35 that includes features of classes to be discriminated, second data 36 of the same type as object data 121 that includes features of the same classes to be discriminated. The control unit 21 acquires learning data for each class and executes the machine learning described above, and as a result, can generate a plurality of trained discriminators 7 that have respectively acquired the capability of generating sets of data that include features of classes different to each other, and are of the same type as data as the object data 121.

Note that, in any of the cases where the types of the first data 35 and second data 36 are different and the same, when the first data 35 and second data 36 are time series data, the discriminators 7 may be trained to generate, from first data 35 at a future time or past time relative to the particular time, second data 36 at that particular time. Also, in the machine learning described above, the control unit 21 may calculate errors between the feature amounts obtained from the encoder 71 and values obtained from a predetermined probability distribution (e.g., Gaussian distribution), and further adjust the values of the computation parameters of the encoder 71 such that the sum of the errors decreases, in addition to the update process described above. With this, the control unit 21 may also normalize the output values of the encoder 71.

Figure 14:
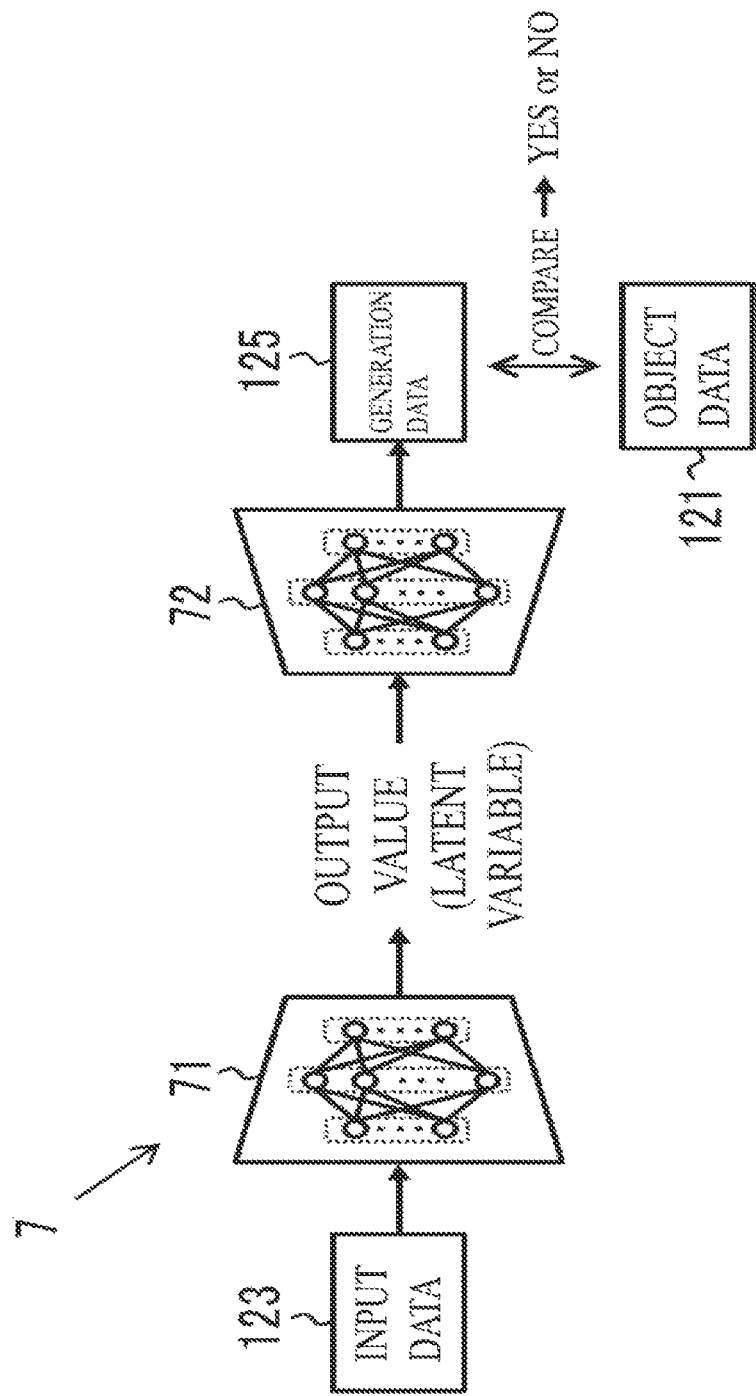
FIG. 14 is a diagram schematically illustrating an example of a usage scenario of a discriminator according to another embodiment or embodiments.

FIG. 14 schematically illustrates an example of a usage scenario of the discriminators 7 according to this modification. In this modification, in step 202 described above, the control unit 11 of the analysis apparatus 1 inputs input data 123 of the same type as the first data 35 to the encoders 71 of the discriminators 7, and executes the computation processes of the discriminators 7. With this, the control unit 11 acquires output values corresponding to sets of generation data 125 that are generated from the input data 123, and is of the same type as object data 121 from the decoders 72. When the first data 35 is data of a different type from the second data 36, the control unit 11 acquires input data 123 to be given to the discriminators 7 separately from the object data 121. The control unit 11 can acquire data of a different type that captures the same event as the object data 121, as the input data 123. On the other hand, when the first data 35 and second data 36 are of the same type, the control unit 11 generates generation data 125 by giving the object data 121 to the discriminators 7 as the input data 123. In this case, the process in step S202 can be simplified by an amount corresponding to the time and effort of acquiring data different from the object data 121 that can be omitted.

Next, the control unit 11 identifies the classes of features included in the object data 121 based on the comparison between sets of generation data 125 generated by the discriminators 7 and the object data 121. As a result of the machine learning described above, the discriminators 7 are configured to generate data that is high in reproducibility regarding features of the corresponding classes, and is low in reproducibility regarding features of other classes. Therefore, when features of a particular class are included in the object data 121, the difference between the generation data 125 generated by the corresponding discriminator 7 and the object data 121 (in the following, may also be referred to as a "reconfiguration error") is small (that is, the matching degree is high). In contrast, when features of the particular class are not included in the object data 121, the difference between the generation data 125 generated by the corresponding discriminator 7 and the object data 121 is large. Therefore, as an example of the discrimination process, the control unit 11 may discriminate that, if the difference between the generation data 125 generated by the corresponding discriminator 7 and the object data 121 is smaller than a threshold value, a feature of a particular class is included in the object data 121 (that is, discrimination is established by the corresponding discriminator 7). On the other hand, if not, the control unit 11 may discriminate that a feature of the particular class is not included in the object data 121 (that is, discrimination is not established by the corresponding discriminator 7). The threshold value may be determined as appropriate. Accordingly, the control unit 11 can identify the class of a feature included in the object data 121 based on the comparison between the sets of generated data 125 generated by the discriminators 7 and the object data 121. When the object data 121 is time series data or multi-dimensional data, the control unit 11 can determine whether or not the discrimination of the corresponding class is established based on the reconfiguration errors in data portions. For example, when the object data 121 is moving image data, the unit of data portion for which the reconfiguration error is to be calculated may be determined as appropriate depending on the embodiment, such as in units of frames or in units of pixels. The processes in step S203 and onward may be similar to those of the embodiment described above.

According to this modification, in the discrimination process in which discriminators 7 that are configured to generate data including features of the corresponding classes are used, the accuracy of discriminating classes of features included in data can be improved. Note that, in this modification, the configurations of the discriminators 7 are not limited to this example, as long as the second data 36 can be generated from the first data 35, and may be determined as appropriate depending on the embodiment. For example, the discriminators 7 need not include the encoder 71 and the decoder 72 as separate units.

In the modification described above, the discriminators 7 acquire the capability of reconfiguring given data, by self-supervised learning. The capability that the discriminators 7 are caused to acquire by self-supervised learning is not limited to this example. The capability to be acquired by the discriminators 7 by self-supervised learning may relate to an action for reconverting data that includes a feature of the corresponding class and is converted according to a predetermined rule, to the original data, for example.

Converting according to a predetermined rule may be rearranging the temporal sequence in time series data, for example. In this case, the action of reconverting to the original data is returning the time series sequence of data in which the time series sequence is rearranged to the original time series sequence. As another example, converting according to a predetermined rule may be rearranging the arrangement of values in multi-dimensional data (e.g., pixel arrangement in image data). In this case, the action of reconverting to the original data is returning the values of data in which the values are rearranged to the original arrangement. As yet another example, converting according to a predetermined rule may be giving a defect to a portion of data. In this case, the action of reconverting to the original data is restoring the original data from the data that is given a defect to a portion thereof.

Note that the rules may be given by designation made by an operator, a setting in a program, or the like. The rules of actions for causing the discriminators to learn may be all the same, or the rule of actions for causing at least one of the discriminators to learn may also be different from the rule of actions for causing the other discriminators to learn. As a result of using data, as the aforementioned first data 35, that is obtained by converting data that includes a feature of the corresponding class according to a predetermined rule, and the data before conversion as the aforementioned second data 36, the discriminators can be caused to acquire the capability of reconverting data that is obtained by converting original data according to the predetermined rule to the original data.

The discriminators that have acquired this capability can be used in a manner similar to the discriminators 7 described above. That is, the control unit 11 generates input data by converting object data 121 according to predetermined rules corresponding to the capabilities that the respective discriminators are caused to acquire. Next, the control unit 11 gives the generated input data to the discriminators and executes the computation processes of the discriminators. With this, the control unit 11 acquires output data corresponding to the result of executing, on the input data, the action of retrieving the original data, from the discriminators. The control unit 11 compares the sets of output data obtained from the discriminators and the object data 121.

As the similarity between the object data 121 and data used in machine learning of a corresponding discriminator increases, the ability of the corresponding discriminator to appropriately retrieve the object data 121 from the input data increases, and therefore the difference between the output data and the object data 121 decreases. On the other hand, if not, the difference between the output data and the object data 121 increases. Therefore, the control unit 11 may discriminate that, if the difference between the output data obtained by the corresponding discriminator and the object data 121 is smaller than a threshold value, the object data 121 includes a feature of the particular class, as an example of the discrimination process. On the other hand, if not, the control unit 11 may discriminate that the object data 121 does not include a feature of that particular class.

<4.3>

In the embodiment described above, the process in step S204 may be omitted. In this case, the assignment unit 114 may be omitted from the software configuration of the analysis apparatus 1. Also, in the embodiment described above, the discriminators 5 may be generated by a computer other than the model generation apparatus 2. In this case, the model generation apparatus 2 may be omitted from the configuration of the analysis system 100.

INDEX TO THE REFERENCE NUMERALS

1 Analysis apparatus
11 Control unit
12 Storage unit
13 Communication interface
14 External interface
15 Input apparatus
16 Output apparatus
17 Drive
111 Data acquiring unit
112 Discrimination processing unit
113 Determining unit
114 Assignment unit
115 Output unit
121 Object data
81 Analysis program
91 Storage medium
2 Model generation apparatus
21 Control unit
22 Storage unit
23 Communication interface
24 External interface
25 Input apparatus
26 Output apparatus
27 Drive
211 Learning data acquiring unit
212 Learning processing unit
213 Saving processing unit
225 Learning result data
82 Generation program
92 Storage medium
3 Learning data
30 Learning data set
31 Training data
32 Correct answer data
5 Discriminator
51 Input layer
52 Intermediate (hidden) layer
53 Output layer

The invention claimed is:

1. An analysis apparatus comprising a processor configured with a program to perform operations comprising:
   operation as a data acquiring unit configured to acquire object data;
   operation as a discrimination processing unit configured to identify classes of features comprised in the object data using a plurality of discriminators that are respectively configured to discriminate presence of features of classes different from each other; and
   operation as a determining unit configured to determine, based on an identification result, data portions in the object data that comprise features of the respective classes, and to determine that a first data portion, with respect to which discrimination is established by one of the plurality of discriminators, but discrimination is not established by the remaining discriminators, comprises a feature of a particular class that is discriminated by the one discriminator, and determine that a second data portion, with respect to which discrimination is established by all of the discriminators comprising the one discriminator, does not comprise a feature of that particular class.

2. The analysis apparatus according to claim 1, wherein the processor is configured with the program to perform operations further comprising:
   operation as an assignment unit configured to assign information indicating that a feature of the particular class is comprised, to the first data portion.

3. The analysis apparatus according to claim 1,
   wherein the processor is configured with the program to perform operations such that operation as the discriminators comprises generating, from first data that comprises a feature of a class to be discriminated, second data that comprises a feature of the class to be discriminated, and is of the same type as the object data, and
   the processor is configured with the program to perform operations such that operation as the discrimination processing unit comprises identifying the class of a feature comprised in the object data, based on a comparison between generation data generated by the discriminators and the object data.

4. The analysis apparatus according to claim 3,
   wherein the first data and the second data are data of the same type, and
   the processor is configured with the program to perform operations such that operation as the discrimination processing unit comprises generating the generation data by giving the object data to the discriminators.

5. The analysis apparatus according to claim 1,
   wherein the object data comprises time series data, and
   the processor is configured with the program to perform operations such that operation as the determining unit comprises determining time sections of the data portions, in the time series data, that comprise the features of the respective classes based on the identification result.

6. The analysis apparatus according to claim 1,
   wherein the object data comprises multi-dimensional data, and
   the processor is configured with the program to perform operations such that operation as the determining unit comprises determining ranges of the data portions, in the multi-dimensional data, that comprise the features of the respective classes based on the identification result.

7. The analysis apparatus according to claim 1,
   wherein the processor is configured with the program to perform operations such that operation as the discriminators respectively comprises discriminating executions of different types of actions performed by an examinee as presence of the features, and
   the processor is configured with the program to perform operations such that operation as the determining unit comprises determining the data portions, in the object data, in which executions of the respective types of actions appear, based on the identification result.

8. The analysis apparatus according to claim 1,
   wherein the discriminators are respectively configured to discriminate executions of different types of processes in a production line as presence of the features, and
   the processor is configured with the program to perform operations such that operation as the determining unit comprises determine the data portions, in the object data, in which executions of the respective types of processes appear, based on the identification result.

9. An analysis method executed by a computer comprising:
   acquiring object data;
   of identifying classes of features comprised in the object data using a plurality of discriminators that are respectively configured to discriminate presence of features of classes different to each other; and
   a step of determining, based on an identification result, data portions in the object data that comprise the features of the respective classes, and determining that a first data portion, with respect to which discrimination is established by one of the plurality of discriminators, but discrimination is not established by the remaining discriminators, comprises a feature of a particular class that is discriminated by the one discriminator, and determining that a second data portion, with respect to which discrimination is established by all of the discriminators comprising the one discriminator, does not comprise a feature of that particular class.

10. A non-transitory computer-readable storage medium storing an analysis program, which when read and executed, causes for causing a computer to perform comprising:
    acquiring object data;
    identifying classes of features comprised in the object data using a plurality of discriminators that are respectively configured to discriminate presence of features of classes different to each other; and
    determining, based on an identification result, data portions in the object data that comprise the features of the respective classes, and determining that a first data portion, with respect to which discrimination is established by one of the plurality of discriminators, but discrimination is not established by the remaining discriminators, comprises a feature of a particular class that is discriminated by the one discriminator, and determining that a second data portion, with respect to which discrimination is established by all of the discriminators comprising the one discriminator, does not comprise a feature of that particular class.

11. The analysis apparatus according to claim 2,
    wherein the processor is configured with the program to perform operations such that operation as the discriminators comprises generating, from first data that comprises a feature of a class to be discriminated, second data that comprises a feature of the class to be discriminated, and is of the same type as the object data, and the processor is configured with the program to perform operations such that operation as the discrimination processing unit comprises identifying the class of a feature comprised in the object data, based on a comparison between generation data generated by the discriminators and the object data.

12. The analysis apparatus according to claim 2, wherein the object data comprises time series data, and the processor is configured with the program to perform operations such that operation as the determining unit comprises determining time sections of the data portions, in the time series data, that comprise the features of the respective classes based on the identification result.

13. The analysis apparatus according to claim 3, wherein the object data comprises time series data, and the processor is configured with the program to perform operations such that operation as the determining unit comprises determining time sections of the data portions, in the time series data, that comprise the features of the respective classes based on the identification result.

14. The analysis apparatus according to claim 4, wherein the object data comprises time series data, and the processor is configured with the program to perform operations such that operation as the determining unit comprises determining time sections of the data portions, in the time series data, that comprise the features of the respective classes based on the identification result.

15. The analysis apparatus according to claim 2, wherein the object data comprises multi-dimensional data, and the processor is configured with the program to perform operations such that operation as the determining unit comprises determining ranges of the data portions, in the multi-dimensional data, that comprise the features of the respective classes based on the identification result.

16. The analysis apparatus according to claim 3, wherein the object data comprises multi-dimensional data, and the processor is configured with the program to perform operations such that operation as the determining unit comprises determining ranges of the data portions, in the multi-dimensional data, that comprise the features of the respective classes based on the identification result.

17. The analysis apparatus according to claim 4, wherein the object data comprises multi-dimensional data, and the processor is configured with the program to perform operations such that operation as the determining unit comprises determining ranges of the data portions, in the multi-dimensional data, that comprise the features of the respective classes based on the identification result.

18. The analysis apparatus according to claim 5, wherein the object data is multi-dimensional data, and the determining unit is configured to determine ranges of the data portions, in the multi-dimensional data, that comprise the features of the respective classes based on the identification result.

19. The analysis apparatus according to claim 2, wherein the processor is configured with the program to perform operations such that operation as the discriminators respectively comprises discriminating executions of different types of actions performed by an examinee as presence of the features, and the processor is configured with the program to perform operations such that operation as the determining unit comprises determining the data portions, in the object data, in which executions of the respective types of actions appear, based on the identification result.

20. The analysis apparatus according to claim 3, wherein the processor is configured with the program to perform operations such that operation as the discriminators respectively comprises discriminating executions of different types of actions performed by an examinee as presence of the features, and the processor is configured with the program to perform operations such that operation as the determining unit comprises determining the data portions, in the object data, in which executions of the respective types of actions appear, based on the identification result.

* * * * *